US008851990B2

(12) United States Patent
Steil

(10) Patent No.: US 8,851,990 B2
(45) Date of Patent: Oct. 7, 2014

(54) METHOD AND APPARATUS FOR AUDIO SCALING AT A DISPLAY SHOWING CONTENT IN DIFFERENT AREAS

(71) Applicant: Bally Gaming, Inc., Las Vegas, NV (US)

(72) Inventor: Rolland N. Steil, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 14 days.

(21) Appl. No.: 13/852,705

(22) Filed: Mar. 28, 2013

(65) Prior Publication Data

US 2013/0231185 A1 Sep. 5, 2013

Related U.S. Application Data

(63) Continuation-in-part of application No. 13/220,254, filed on Aug. 29, 2011, now Pat. No. 8,597,118.

(51) Int. Cl.
G07F 17/32 (2006.01)
A63F 13/00 (2014.01)

(52) U.S. Cl.
CPC ............ *G07F 17/3211* (2013.01); *A63F 13/00* (2013.01)
USPC .................. 463/31; 463/30; 463/37; 463/35; 705/57; 705/51

(58) Field of Classification Search
USPC .......................................... 463/35, 30, 31, 37
See application file for complete search history.

(56) References Cited

U.S. PATENT DOCUMENTS

| | | | |
|---|---|---|---|
| 2006/0223627 A1* | 10/2006 | Nozaki et al. ................... | 463/20 |
| 2009/0258697 A1* | 10/2009 | Kelly et al. ..................... | 463/20 |
| 2011/0045905 A1 | 2/2011 | Radek | |
| 2011/0118013 A1* | 5/2011 | Mattice et al. .................. | 463/30 |
| 2012/0172119 A1* | 7/2012 | Kelly et al. ..................... | 463/31 |
| 2012/0220360 A1* | 8/2012 | Kelly et al. ..................... | 463/20 |
| 2012/0258803 A1* | 10/2012 | Kelly et al. ..................... | 463/37 |
| 2013/0331184 A1* | 12/2013 | Kelly et al. ..................... | 463/31 |

* cited by examiner

Primary Examiner — Pierre E Elisca
(74) Attorney, Agent, or Firm — Marvin Hein

(57) ABSTRACT

A method and device for scaling audio content associated with first and second sources at a user apparatus such as a gaming machine. When the gaming machine is in a first condition displaying only game content speakers are controlled to produce game related audio content. In a second condition where the display is controlled to share game content and other content from a remote source in a picture-in-picture arrangement, the method and device control the speaker volumes to associate the audio content with the associated video content to provide audio directionality and primacy.

22 Claims, 32 Drawing Sheets

Overlaid Game Content iView Content Overlaid
(with Transparency)

Re-mapped Game Touch Coordinates

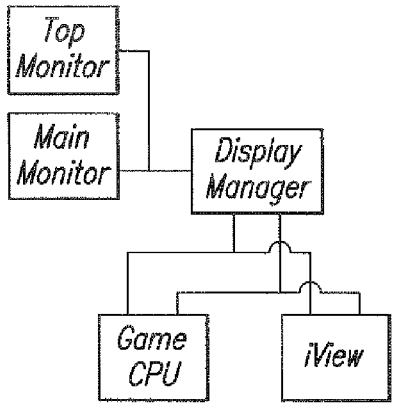
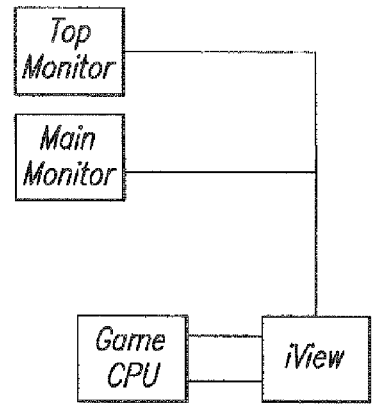
FIG. 15A    FIG. 15B
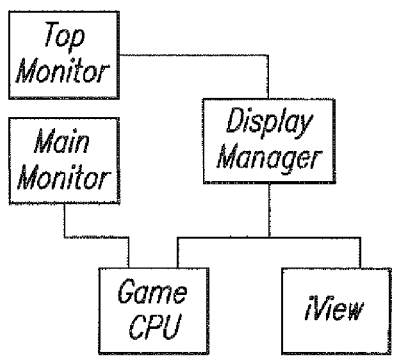
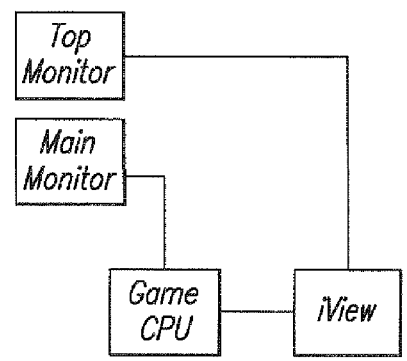
FIG. 16A    FIG. 16B
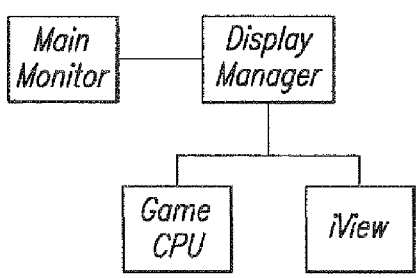
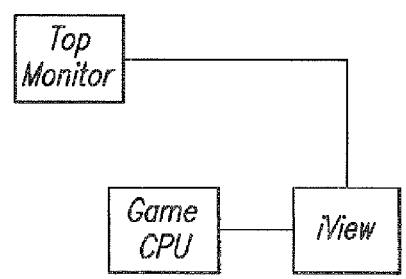
FIG. 17A    FIG. 17B

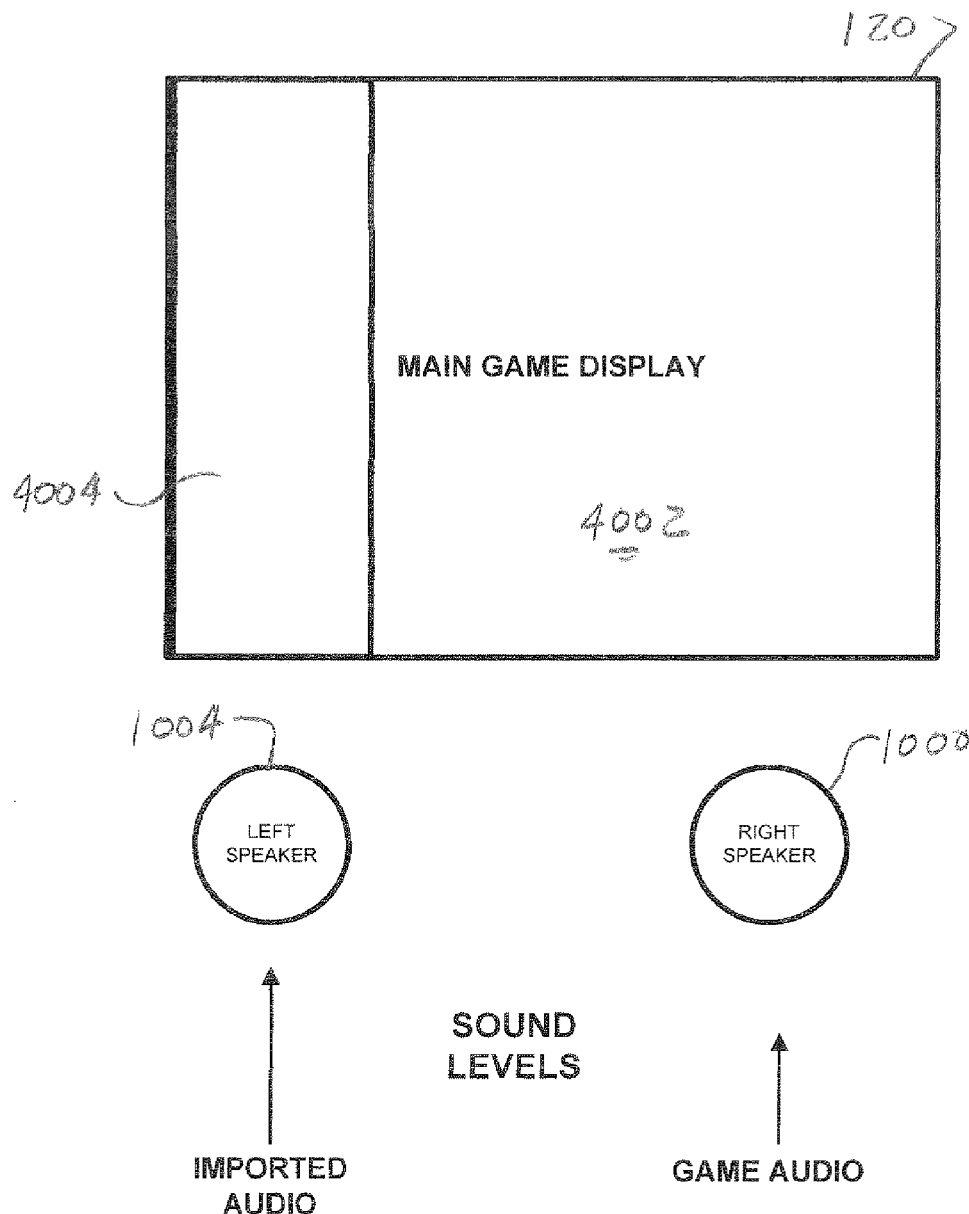

METHOD AND APPARATUS FOR AUDIO SCALING AT A DISPLAY SHOWING CONTENT IN DIFFERENT AREAS

RELATED APPLICATION

This application is a continuation-in-part application of U.S. patent application Ser. No. 13/220,254 filed Aug. 29, 2011 and titled METHOD, APPARATUS AND SYSTEM FOR VIDEO TUNING OF A VIDEO SWITCHING DEVICE FOR A GAMING MACHINE which is related to U.S. Patent Application Publication No. 2009/0149253 by Bryan Kelly et al and titled "Video Switcher and Touch Router Method for a Gaming Machine and filed Jan. 8, 2009 and related applications recited therein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

The disclosed embodiments relate to apparatus and methods which augment the shared display of content from various sources at a display by controlling audio content and volume to be delivered, at least in a primacy form, to speakers directionally associated with the location of the content at the shared display. More particularly it relates to apparatus and methods for controlling such delivery of audio content in legacy gaming machines.

BACKGROUND

Providing Picture-in-Picture (PIP) features and multi-framed screens have been implemented on gaming machines. This typically has been achieved by programming screen real estate segmentation into a controlling software application and a process running on a single or multi-core CPU to specifically draw the output into each frame. The drawing software may be accomplished by rendering streaming media sourced from a local or network media service (e.g., Adobe Flash Server, Windows Media Server), by rendering marked-up commands (e.g., HTML) served up from a local or remote web service, or by direct programmatic manipulation of graphics.

Traditionally, wagering-related game presentations (spinning reels or video games) on an electronic gaming machine are presented on one or more video displays. One of these displays, called the Main Game Display, is usually positioned directly in front of and within arms reach of the casino patron seated in front of the machine, providing optimal viewing and physically interacting with the electronic gaming machine. System information, on the other hand, has traditionally been presented via a separate stand-alone display, called a System Display or iVIEW® (iView® is a Registered Trademark of Bally Gaming International, Inc.), usually much smaller in size, located above, below, or to the side of the Main Game Display. System information traditionally displayed has included the patron's name, loyalty club information, casino marketing messages, and interaction with secondary marketing promotions, bonus games, sweepstakes, and tournaments. This System Display generally is a separate, small, multi-line text or LCD graphical display. In both cases, it is not optimally positioned for either capturing the patron's attention or for viewing in general.

A need has been recognized to exist to enhance the patron's overall gaming experience by presenting key system information at a location optimized for notification and viewing by the player. An ideal location would be on the Main Game Display since all gaming cabinets are designed with this display placed for optimal interaction with the wagering game, including bar top, slant top, and upright-style electronic gaming cabinets.

Many secondary displays on a gaming machine are underutilized. Many are used simply as static electronic glass. Others provide a secondary display for displaying bonus games or progressive meters in conjunction with the wagering game on that cabinet while a patron is wagering on the device. A need has been recognized to exist to more effectively utilize this secondary display, especially when no one is actively wagering on the gaming machine by displaying casino specific messages, for example, advertising the specific game, casino events and promotions, responsible gaming messages, or other types of advertisements and messages. It would be advantageous to display these messages located for optimal viewing by patrons in the vicinity of the electronic gaming machine, not just sitting in front of the machine. For many electronic cabinet styles, this would be the secondary display often located above the Main Game Display.

Currently, a separate screen is used to display system information while maintaining a separation between the gaming machine, with one or more master gaming controllers, from the associated equipment player tracking device. A need has been recognized to exist to reduce costs by eliminating the separate display used for system information. It would be advantageous to display both wagering game and system information on the same display.

Also currently, system information is streamed or otherwise communicated through TCP/IP, serial ports, USB, and other methods to a software component running on the master gaming controller that renders the content and manages the interactivity with the patron, for example, touches. This exposes the master gaming controller to aberrant and malicious software compromising the integrity of the wagering game. Further, substandard and poorly implemented software consumes more than its share of resources and affects the performance and function of the wagering game. Therefore, a need exists for the wagering gaming device and software that renders the system information to be separated and protected from each other.

Where system information is rendered through software components running on the master gaming controller, the operating software must be designed in such a way to ensure the integrity of the wagering game software is also running on the master gaming controller. As a result, when new system-only capabilities are needed, such as a new biometric camera, which do not directly affect or are directly used by the wagering game, each game manufacturer must update their operating system software to support such features and new devices. This results in slower time to market for such features since each manufacturer must have their platform approved by regulators. This further results in inconsistency across a given casino floor since manufacturers employ different schedules for implementation. Accordingly, a need exists to share the touch displays with no changes being required in the wagering game software, or game operating system, or any other software running on the master game controller.

Furthermore, a need exists to employ shared wagering game and system touch displays on legacy electronic gaming machines without affecting the performance of either the wagering game or the system content. By legacy gaming machines, what is meant is exiting gaming machines from various manufacturers, which include the drawbacks noted herein. These machines may have previously been deployed in the field (i.e. casinos and other regulated gaming venues) or are machines of the same design or which have not been manufactured/programmed to a common standard. This description should not been deemed to be exclusive or all encompassing of legacy gaming machines. Updates to system-driven content will not touch the regulated gaming software. Also, a need exists to employ shared wagering game and system touch displays with a consistent experience. It would be advantageous for the customer experience to be consistent on all electronic gaming machines across all manufacturers, and across all games and computer hardware configurations on a casino floor. There exists a need to maintain the well-defined separation between regulated gaming equipment and associated equipment.

A need also exists to allow patrons to interact with the gaming machine based on what is shown on the shared displays. The patron's touches must be sent to the correct source of what is being shown on the shared display at the point where the patron touched. It would be advantageous to process and route the touches with no changes being required in the wagering game software or game operating system or any other software running on the master game controller.

In regards to legacy and other gaming machines, it often occurs that the video signals generated to the main game display have non-uniform characteristics. These video characteristics may be tied to content such as one or more game title software. As such, in attempting to mix game produced video signals with signals from a secondary source, can result in an error message and/or improper positioning of the composite content at the display. The video processing software/firmware, based upon the signals, may not be able to determine the video characteristic including video "blanking periods" which define the margins of the video and accordingly the video processor may generate an error message or misalign the image at the display. In the prior art it has been necessary for designers to configure the video display and/or video processor by attempting to determine the blanking periods and programming the video manager firmware. A degree of trial and error may be required. Further, for each new video format encountered the revised video manager may require regulatory approval. Suffice it to say, if a video processor is to be configured to be installed in legacy gaming machines of different manufacture and to process video signals for different video formats, significant and ongoing development and other resources will be required to accommodate those various video modes until standardization is adopted by the industry.

Further it would be advantageous if the video manager could be configured to display at the game display (primary or secondary) a diagnostic dashboard.

In relation to providing content from several sources such as first video content and second video content to a shared display, such content may include associated audio content. As but an example in gaming machines, the first content may be video game content and associated audio content related to the game. The second video and second audio content may be from a source such as a system host computer providing a system-configured game, advertising, and/or information related to a player system interface or other information. The first and second video content may be configured to share the video display in various arrangements such as side-by-side, top and bottom, one of the content occupying a small display window or in a superimposed relationship as by, for example, the second video content being semi-transparent and overlying a portion of the wagering game video content. As a non-limiting example, the game video content may occupy the left side of the display with the system provided video content occupying the right side of the display.

Devices such as gaming machines or terminals typically have a plurality of speakers spaced in various locations near the video display. It would be advantageous to control the speakers such that one or more speakers directionally related to the first video content location are controlled to project at a scaled volume, at least primarily, the first audio content and one or speakers directionally related to the location of the second video content at the display are controlled to project at a scaled volume the second audio content. Such a feature would provide audio directionality to the user/player such that, when the first video content has primacy at the video display, it's associated one or more speakers are driven to associate the audio with the direction (to the user/player) of the first video content at a scaled volume, i.e. louder than the second audio content or to the exclusion of the second audio content. When the second video content has primacy, such as when a system delivered game is being played or the player is interfacing with a system feature, it's associated one or more speakers are driven to associate the audio with the direction of the second video content at a scaled volume. Primacy (i.e. scaled to be louder than other audio content) or exclusivity of directional delivery of scaled audio content to the speakers may be according to a default protocol or may be controlled by the content applications or remote configuration or command.

SUMMARY

In accordance with one or more embodiments, devices and methods are provided for connecting to an existing apparatus of the type having one or more processors configured to control a video display in a first condition to display first video content and in a second condition to control the video display to display the first video content at a first location at the video display and second video content from a second source at a second location. The one or more processors are configured to control speakers to deliver a first audio content associated with the first video content. For example where the apparatus is a gaming machine the one or more processors control the video display to display a video game and a plurality of speakers to project audio sounds associated with the game display. The device includes at least one controller and a connector to re-direct the first audio content and provide the same to the at least one controller. A source of second audio content associated with the second video content. The source may be remote source or a local source. For example where the apparatus is a gaming machine the source of the second audio content may be system delivered video and audio content associated with a game, advertising or player information. The at least one controller is configured to, in a first condition, control the speakers to produce the first audio content and in a second condition control at least one first speaker directionally associated with the first location to provide audio associated with the first content and at least one second speaker directionally associated with the second location audio associated with said second channel to provide scaled audio directionality associated with said display of said first and second content.

For example, the first speaker may be located proximate the right hand side of the video display and the second speaker is located proximate the right hand side of the video. When the one or more processors control the display to a second condition and the first content is positioned at the right hand side of the video display and the controller drives the right hand speaker to scale the audio volume associated with the first content. The left hand speaker is controlled to scale the audio volume associated with the second content.

The scaling of the volumes of the first and second audio content may be controlled to provide simultaneous audio at substantially equal volumes, i.e. equal volume primacy, or to scale volume primacy to one audio content over the other based upon the video content, a predetermined protocol or operator control. For example, where the device is a gaming machine and the first video content is gaming content and the second video content is system related content such as player account information, the device may be configured to scale volume primacy to the first video content for the game. By primacy what is meant is that during the play of the game its associated audio content is louder than or is exclusive to any audio associated with the second video content. Primacy may switch to the second audio content when, for example, the player is interfacing with the system related content. Primacy may be also based upon emergency situations to deliver a system provided message to the players, for play of a system related secondary or bonus game or the like. Primacy of the audio may also be based upon the actions of the user/player. For example, while interfacing with the system related content the system audio would be given primacy. When the player then initiates the play of a game, primacy is then accorded to the speakers associated with the game video content.

Where the player may control the locations on the shared video display of the first and second video content, the controller is configured to associate the corresponding audio content to the speaker directionally related to its video content.

The device may be incorporated with a Video Switching Device disposed between the one or more processors and video display or may be a separate component.

Preferably the device and methods of the present invention provide for retro-fitting of existing apparatus such as gaming machines to provide the benefits and features recited herein.

Further aspects, features and advantages of various embodiments of the disclosed embodiments may be apparent from the following detailed disclosure, taken in conjunction with the accompanying sheets of drawings.

BRIEF DESCRIPTION OF THE DRAWINGS

FIG. 15A is a component diagram depicting the video connectivity mapping of an embodiment including a video cabinet with a main monitor and a top monitor, where one Display Manager drives both monitors;

FIG. 15B is a component diagram depicting the touch connectivity mapping of the embodiment shown in FIG. 15A;

FIG. 16A is a component diagram depicting the video connectivity mapping of an embodiment including a video cabinet with a main monitor and a top monitor, where one Display Manager drives only the top monitor;

FIG. 16B is a component diagram depicting the touch connectivity mapping of the embodiment shown in FIG. 16A;

FIG. 17A is a component diagram depicting the video connectivity mapping of an embodiment including a video cabinet with a single monitor, where one Display Manager drives the monitor;

FIG. 17B is a component diagram depicting the touch connectivity mapping of the embodiment shown in FIG. 17A;

FIG. 41 illustrates the scaling of audio primacy to gaming machines speakers according to the present invention to provide directionality to the gaming machine sounds.

DETAILED DESCRIPTION

Various embodiments are directed to sharing touch displays between one or more Master Gaming Controllers and one or more associated equipment devices, (e.g., a player tracking unit) using a Video Switcher and Touch Router Device (sometimes referred to herein as a "Display Manager"), to enable system menus and other Picture-in-Picture applications to overlay the wagering game. Other embodiments may include sharing the display between one or more wagering games and one or more system marketing promotions, e.g., advertising, loyalty, customer-centric messages, video conferencing, and video-on-demand applications. Generally, the terms "mixing" and "re-rendering" (e.g., switching, arbitrating, redistributing, routing, or the like), and other forms of each, refer to original signals being passed through a switching device without any copying and/or saving of the signals or associated data. However, it will be appreciated by those skilled in the art that other embodiments may use any form of video signal processing herein.

1. Video Processing for a Gaming Machine

Figure 1:
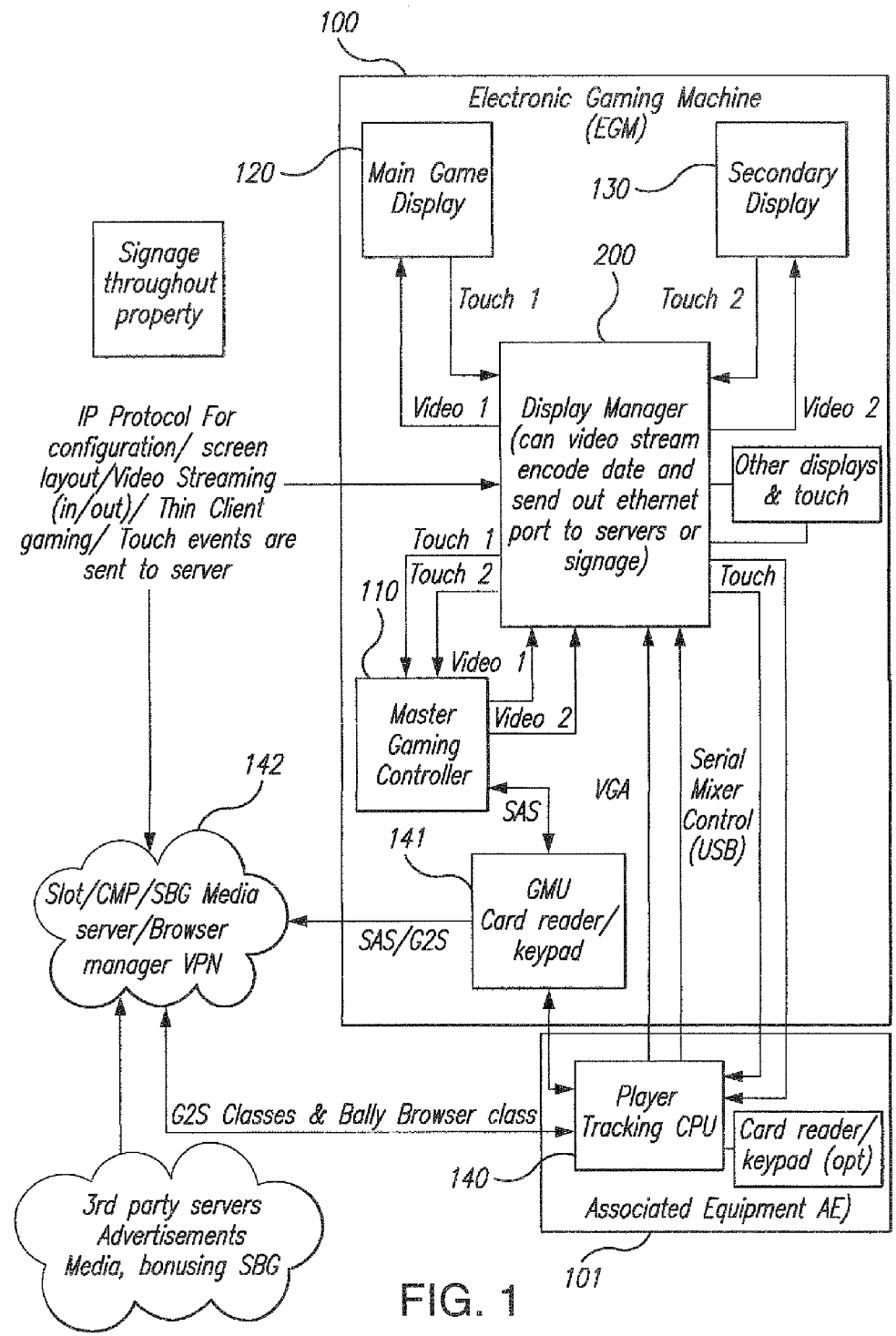
FIG. 1 is a component diagram of a Display Manager connected to components of an Electronic Gaming Machine and Player Tracking Device.

Referring to FIG. 1, a component diagram depicts a Display Manager 200 (i.e., Video Switcher/Touch Router Device) connected to main components of a gaming machine 100 and associated equipment. In one embodiment, the Display Manager 200 receives one or more video signals from a Master Gaming Controller 110 and Player Tracking Unit 140. The Display Manager 200 receives touch signals from touch screen controllers on a Main Game Display 120 and a Secondary Display 130, and routes the signals to the Master Gaming Controller 110 or Player Tracking Unit 140. In one embodiment, the Player Tracking Unit 140 communicates with the Master Gaming Controller 110 through a Game Monitoring Unit (GMU) 141. The GMU 141 provides a communication interface between the Master Gaming Controller 110 and a Slot Virtual Private Network to handle such things as slot accounting, and the like.

The Display Manager 200 has the ability to build a video stream from the video signals from the Master Gaming Controller 110 and/or Player Tracking Unit 140. As hereinafter described, the video signals from the Master Gaming Controller 110 may represent a first video content and be of a first characteristic. The first characteristic may include, for example for legacy gaming machines 100, sometimes unique signal timing including horizontal scanning frequency (or period), vertical scanning frequency (or period), and the number of horizontal lines including blanking periods. The Player Tracking Unit 140, installed in the gaming machines 100 throughout the casino, is typically from a single manufacturer such as the iView® device from Bally Technologies. The video signals from (or through) the Player Tracking Unit 140 are, except perhaps where the gaming machine 100 is from the same manufacturer as the Player Tracking Unit 140, of a second video content and characteristic. This video stream may be then sent over Ethernet to a server, another gaming device, or to overhead signage. This allows the game presentation to be sent enterprise-wide for broadcast purposes. A non-limiting example is that a jackpot win may have the game screens sent to overhead LCD signs throughout the casino and on web portals. This creates the excitement for all players and not just the one who triggered the progressive. Also the Display Manager 200 may receive a video stream from a second video source such as a server and blend this video stream into one or more Picture-In-Picture ("PIP") window frames or semi-transparent overlays viewable on one or more LCD displays at the same time. Server executed games may be video streamed to this Display Manager 200 for presentation to the player. Player inputs from the button deck and touch screen may be sent to the Server-Based Game Engine (SBG) for processing. In some embodiments the Master Gaming Controller 110 is not needed to provide a thin-client gaming device. The only components needed are the Display Manager 150 and the peripheral controller. All RNG (Random Number Generator) game outcomes are determined and rendered on the servers. Even skill or skill predominate games may execute on the server and be presented to the user over this video stream.

Figure 2:
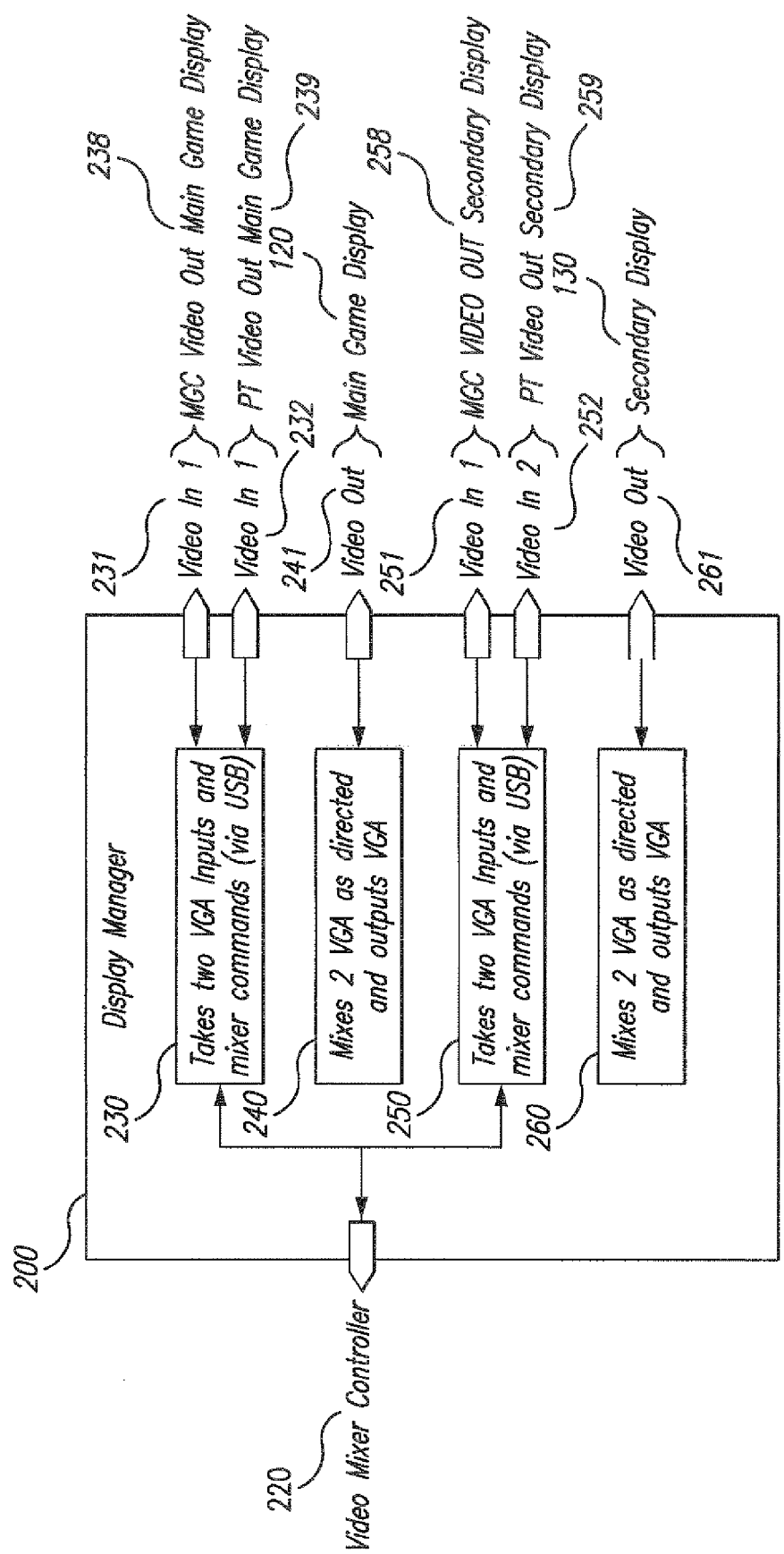
FIG. 2 is a component diagram of the components of the Display Manager.

The component diagram of FIG. 2 depicts a Display Manager 200 used for switching video signals and outputting the result to the Main Game Display 120 or Secondary Display 130. In a preferred embodiment, the Display Manager 200 has one or more video input ports 231 and 232 that receive first content video signals 230 intended for the Main Game Display 120, from a Master Gaming Controller video output 238 and second video content signals from a Player Tracking Unit video output 239. As described above the video signals 230 from the Master Gaming Controller 110, particularly for legacy gaming machines, are of a first characteristic which may vary from manufacturer to manufacturer and from content to content. For example a manufacturer A may produce first video signals have a common characteristic that is carried through for all of the video signals from the Master Gaming Controller 110, e.g. gaming related content whereas manufacturer B may produce first video signals having a different characteristic. Often the characteristics are difficult to discern requiring deconstruction of the signals and trial and error to make sure that the Display Manager 200 conforms the video stream to the Main Game Display 120 and/or Secondary Display 130. The Display Manager 200 receives instructions through a Video Switcher Controller port 220. Using the video signals, the Display Manager 200 mixes 240 (e.g., switches, arbitrates, redistributes, or the like) the video signals as directed by the commands coming in from the Video Mixer Controller 220 and outputs the result through a video-out port 241 that is connected to the video-in port on the Main Game Display 120.

In another embodiment, the Display Manager 200 also has one or more video input ports 251 and 252 that receive video signals 250 intended for the Secondary Display 130 from a Master Gaming Controller video output 258 and Player Tracking Unit video output 259. The Display Manager 200 receives instructions through the Video Mixer Controller 220. Using the video signals, the Display Manager 200 mixes 260 (e.g., switches, arbitrates, redistributes, or the like) the video signals as directed by the commands coming in from the Video Mixer Controller 220 and outputs the result through the video-out port 261 that is connected to the video-in port on the Secondary Display 130.

In one embodiment, these video input and output connections 231, 232, 241, 251, 252, and 261 are 15-pin SuperVideo Graphics Array ("SVGA"). In an alternative embodiment, these video connections may be 9-pin Video Graphics Array ("VGA"), 15-pin SVGA, Low-voltage differential signalling ("LVDS"), Digital Visual Interface ("DVI"), any other video signal connection, or any combination thereof. The Master Gaming Controller 110 may be transmitting one or more protocols such as, but not limited to:

| Name | x (width) | y (height) | Aspect Ratio |
|---|---|---|---|
| VGA | 640 | 480 | 4:3 |
| SVGA | 800 | 600 | 4:3 |
| XGA | 1024 | 768 | 4:3 |
| XGA+ | 1152 | 864 | 4:3 |
| SXGA | 1280 | 1024 | 5:4 |
| SXGA+ | 1400 | 1050 | 4:3 |
| UXGA | 1600 | 1200 | 4:3 |
| QXGA | 2048 | 1536 | 4:3 |
| WXGA* | 1366 | 768 | 16:9 |
| WXGA+* | 1440 | 900 | 16:10 |
| WSXGA* | 1600 | 1024 | 16:10 |
| WSXGA+ | 1680 | 1050 | 16:10 |
| WUXGA | 1920 | 1200 | 16:10 |
| WQXGA | 2560 | 1600 | 16:10 |

In one embodiment, the Video Mixer Controller 220 is a USB port. In an alternative embodiment, the port may be an RS-232 serial port or Ethernet port and connected to a server or other controller inside the gaming cabinet.

Figure 3A:
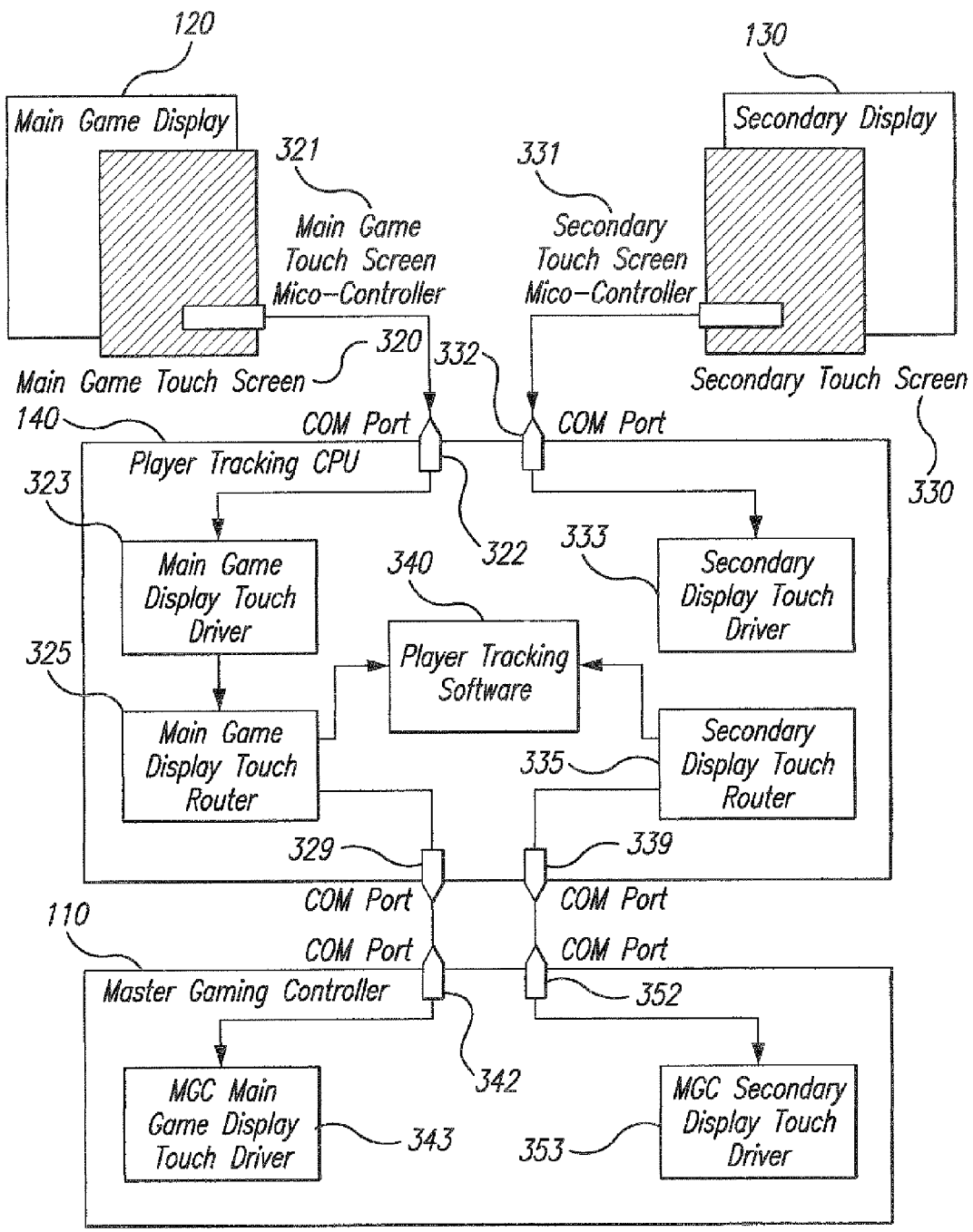
FIGS. 3A and 3B are component diagrams of the Touch Router.

Referring now to FIG. 3A, Touch Routers 325 and 335 are shown receiving touch signals from touch controllers 321 and 331 and routing the signals to the appropriate software applications. In one embodiment, the Touch Routers 325 and 335 are executed on the Player Tracking Unit 140. In this embodiment, the Main Game Display 120 is fitted with a Main Game Touch Screen 320. The Main Game Touch Screen is connected to the Main Game Touch Screen micro-controller 321. The micro-controller registers the touches by sending signals and commands to a Main Game Display Touch Driver 323 on the Player Tracking Unit 140. The micro-controller is connected to the Player Tracking Unit 140 via a COM port 322.

The Main Game Display Touch Driver 323 receives the micro-controller messages and commands and calculates the pixel coordinate of the touch and communicates these coordinates to the Main Game Display Touch Router 325. The Main Game Display Touch Router 325 determines if the touch occurred over the scaled and shifted video input from the Master Gaming Controller video input 231 or the Player Tracking Unit video input 232 to determine the proper destination to route the touch message. The touch message is either routed to the Player Tracking Software 340 or to the Main Game Display Touch Driver 343 on the Master Gaming Controller 110. The Player Tracking Unit 140 connects to the touch driver via a COM Port-Out 329 on the Player Tracking Unit connected to a COM Port-In 342 on the Master Gaming Controller 110.

In another embodiment, the system created content is rendered in an overlay window that occludes main game content. The non-remapped or scaled touch screen input data may be sent to both the Master Gaming Controller and the player tracking software and to the servers for processing. Otherwise stated, all applications receive all touch events, and each application processes these events in their own ways.

In another embodiment, the Secondary Display 130 is fitted with a Secondary Touch Screen 330. The Secondary Touch Screen is connected to the Secondary Touch Screen micro-controller 331. The micro-controller registers the touches by sending signals and commands to a Secondary Display Touch Driver 333 on the Player Tracking Unit 140. The micro-controller is connected to the Player Tracking Unit 140 via a COM port 332. The Secondary Display Touch Driver 333 receives the micro-controller messages and commands and calculates the pixel coordinate of the touch and communicates these coordinates to a Secondary Display Touch Router 335. The Secondary Display Touch Router determines if the touch occurred over the scaled and shifted video input from the video input 251 or the Player Tracking Unit video input 252 to determine the proper destination to route the touch message. The touch message is either routed to the Player Tracking Software 340 or to the Secondary Display Touch Driver 353 on the Master Gaming Controller 110. The Player Tracking Unit 140 connects to the touch driver via a COM Port-Out 339 on the Player Tracking Unit connected to a COM Port-In 352 on the Master Gaming Controller 110.

Figure 3B:
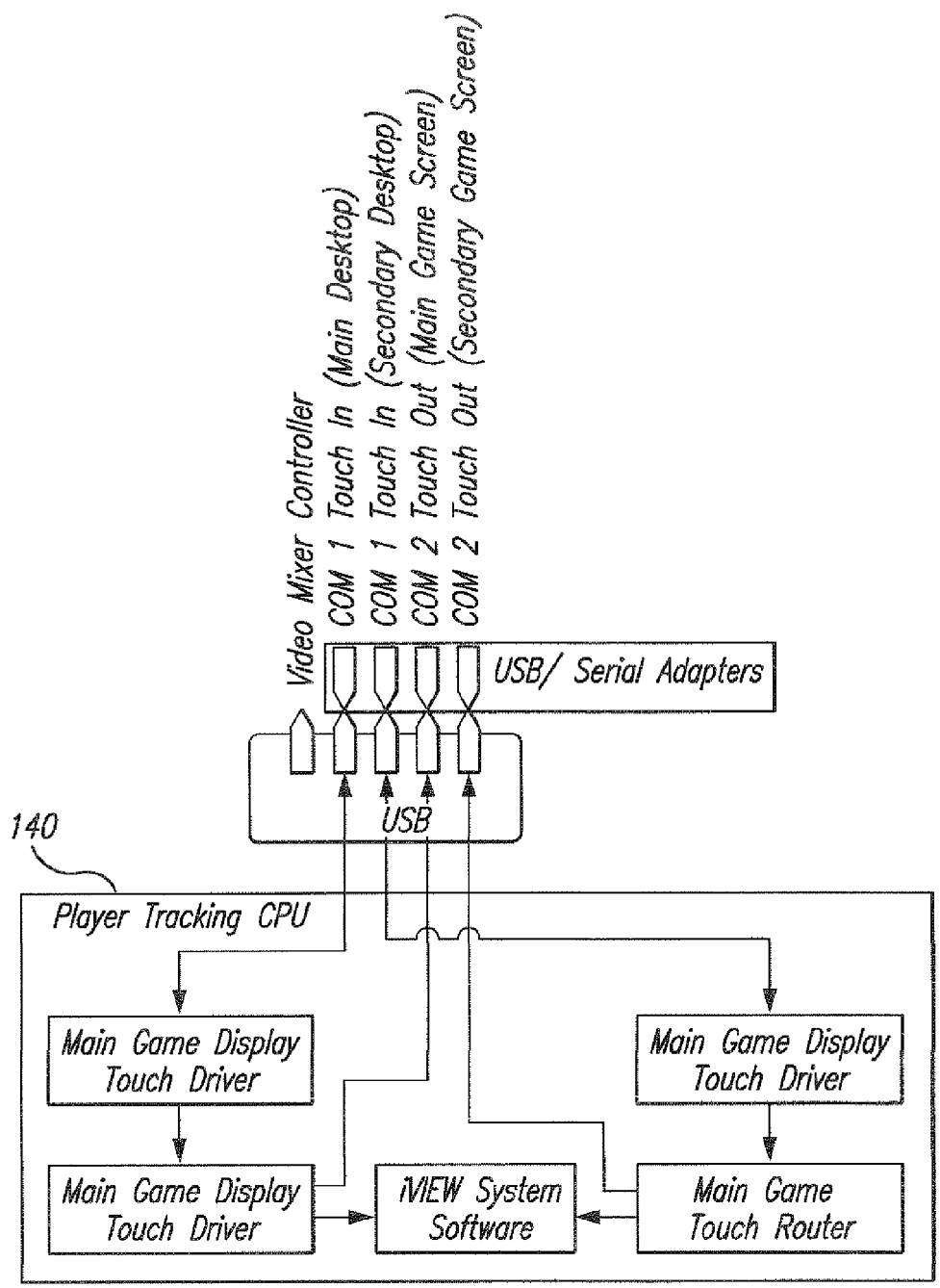

In one embodiment, the COM ports 322, 329, and 342 may be RS-232 serial ports. An alternative embodiment may use a USB port. Still another embodiment may use a combination of USB and serial ports, using USB-to-serial converters to allow RS-232 communications through USB ports. Those skilled in the art will appreciate that other ports may also be used, such as Ethernet, TCP/IP, and parallel ports. Referring to FIG. 3B, an embodiment is shown that utilizes a USB hub.

In still another embodiment, the Main Game Touch Screen 320 and the Secondary Touch Screen 330 use Sound Acoustic Wave technology to calculate the location of the touch. Alternative non-limiting embodiments may incorporate touch screens utilizing Resistive, Capacitive, Infrared, Strain Gauge, Optical Imaging, Dispersive Signal Technology, Acoustic Pulse Recognition, Frustrated Total Internal Reflection technologies, any multi-touch capable display technology, or any combination thereof.

Figures 4A, 4B:
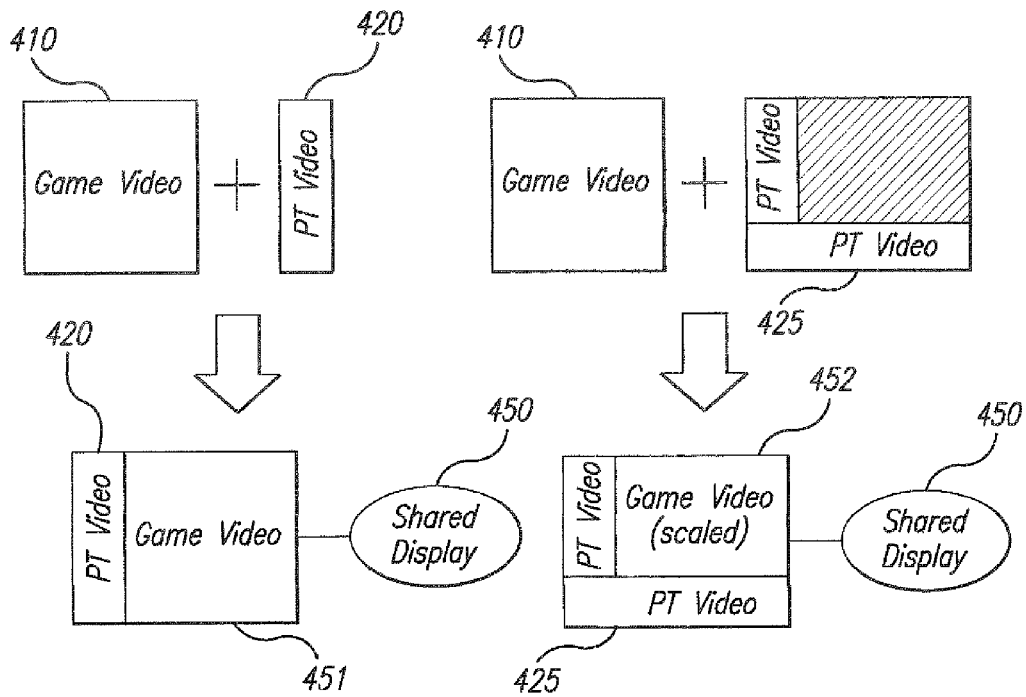
FIGS. 4A through 4C are diagrams of different screen splitting embodiments.
Figure 4C:
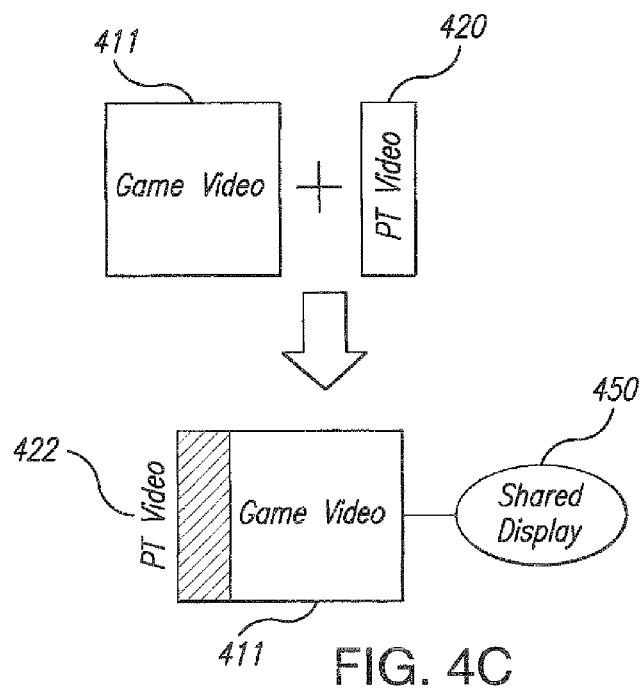

A series of diagrams are shown in FIGS. 4A through 4C demonstrating several methods of video switching of two video inputs 410 and 420 or 425, and displaying both simultaneously on a shared display 450. FIG. 4A demonstrates a split screen scenario. In one embodiment, the Display Manager 200 receives the Game Video 410 and Player Tracking Unit Video 420 and displays them side-by-side on a screen of the shared display. In a non-limiting embodiment, the Player Tracking Unit Video 420 is not scaled or shifted, but a resulting Game Video 451 has been scaled horizontally so that both video signals are displayed on the screen simultaneously. In another embodiment, the Player Tracking Unit Video is positioned towards the bottom of the display and scales the Game Video vertically. Still another embodiment scales both the Player Tracking Unit Video and the Game Video. Another alternate embodiment has a screen display that is larger and has a higher resolution than either the Game Display or Player Tracking Unit Display such that both video outputs may be displayed on a split screen without scaling either one.

Referring to FIG. 4B, a Picture-in-Picture scenario is demonstrated. In this embodiment, a screen layout of the Player Tracking Unit Video 425 is designed so that a space is reserved for overlaying the Game Video 410. The Display Manager 200 scales and shifts a resulting Game Video 452 so that it is positioned above the reserved area on the player Player Tracking Unit Video 425 in the shared display 450. In an alternative embodiment (not shown), an area of the screen layout on the game is reserved, and the Player Tracking Unit Video is overlaid on top of the game. This might be reserved for such information as player name, credits available, or other game or system information.

Referring now to FIG. 4C, a transparency scenario is depicted. In this embodiment, the Player Tracking Unit Video 420 is overlaid on top of a Game Video 411 in the shared display 450. The Game Video is able to be viewed through a resulting Player Tracking Unit Video 422 with a customizable level of transparency from 0% (Player Tracking Unit Video is completely opaque) to 100% (Player Tracking Unit Video is completely transparent). In another embodiment, it is advantageous and aesthetically pleasing to alter this level very quickly in a short period of time. When the level changes from 0 to 100 or alternatively from 100 down to 0, continuously or at certain values in the range, the resulting effect is for the Player Tracking Unit Video 422 to fade in or fade out over the Game Video 411.

Figure 5:
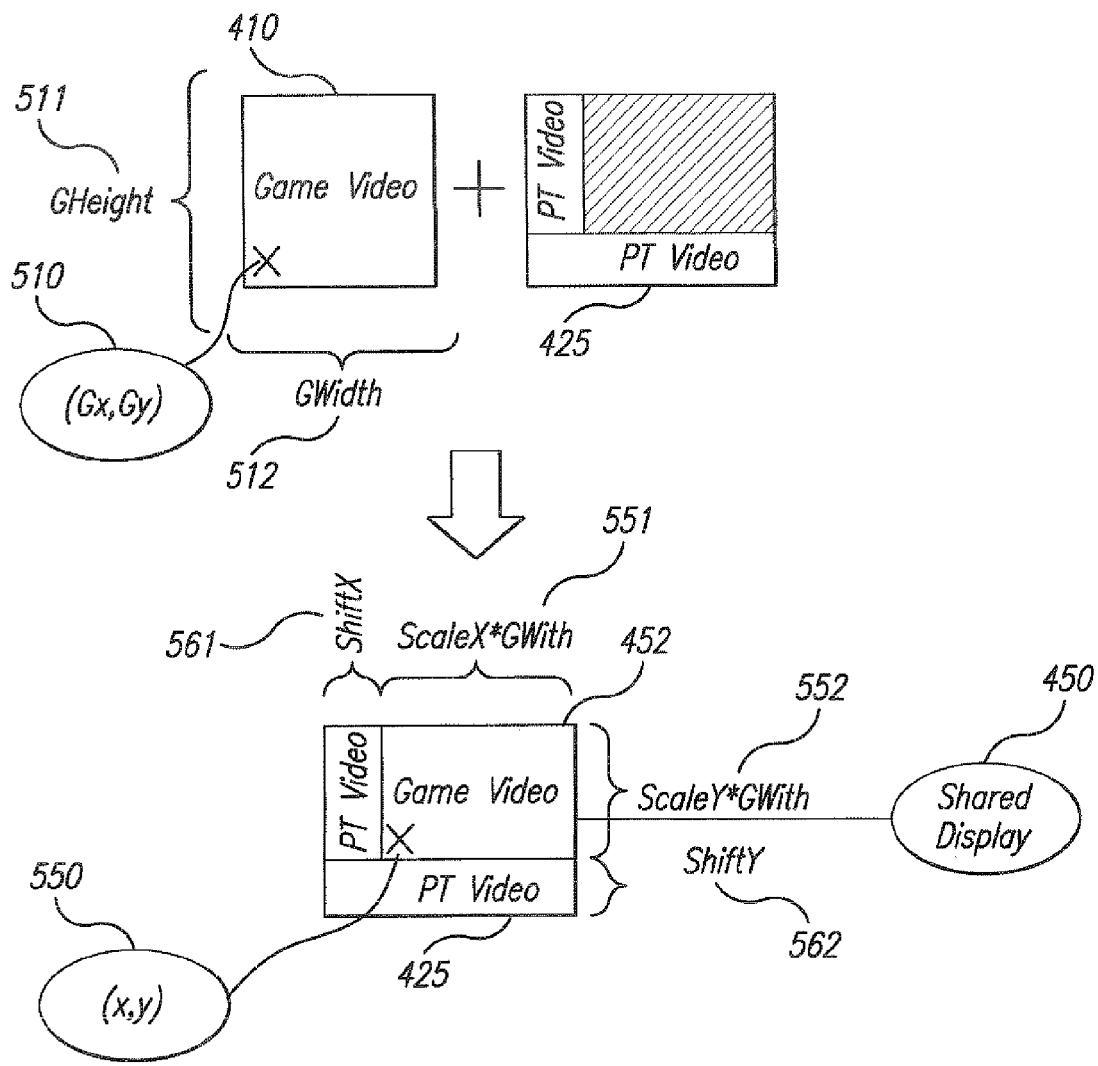
FIG. 5 is a diagram demonstrating how the Video Switcher scales video.

FIG. 5 shows the scaling performed on the Game Video. In this embodiment, the Game Video 410 is scaled and shifted and displayed Picture-in-Picture 452 on the shared display 450. The original Game Video height ("GHeight") 511 and width ("GWidth") 512 is scaled horizontally by a factor of ScaleX (0 to 100%) and vertically by ScaleY (0 to 100%). A resulting Game Video 452 has a width of ScaleX*GWidth 551 and a height of ScaleY*GHeight 552. The scaled Game Video 452 is shifted horizontally by ShiftX 561 and vertically by ShiftY 562, so that its lower left coordinate (0,0) on the original Game Video 410 is physically located at coordinate (ShiftX, ShiftY) on the shared display 450. Coordinate (Gx, Gy) 510 on the Game Video 410 would be translated to (x, y) 550 on the shared display 450 in such a way that:

$$x = ShiftX + (ScaleX * Gx)$$

$$y = ShiftY + (ScaleY * Gy)$$

It should be recognized that for proper video presentation and scaling it is necessary to define, for the video stream, the edges of the display so that the content is not lost "off screen".

Figure 6:
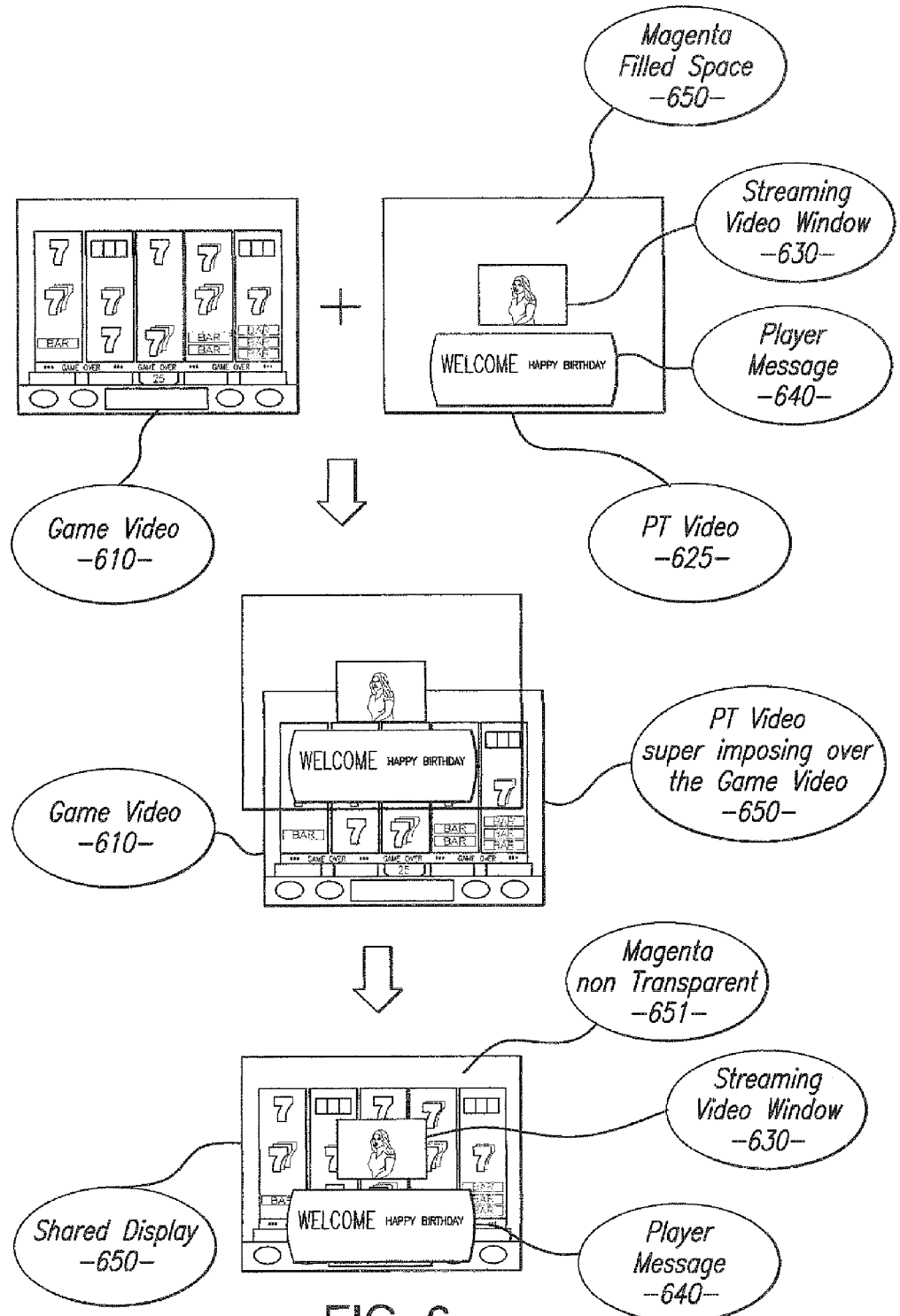
FIG. 6 is a diagram demonstrating super imposing one video stream over another.

Still in another embodiment, one video input is superimposed over another, allowing part of a first video signal to be fully transparent, thus allowing the second video signal to be completely visible at those coordinates, while having other parts of the first video signal to completely obscure the second signals at other coordinates. FIG. 6 is a diagram demonstrating one embodiment where a system video signal is superimposed over the Master Game Controller signal. In a non-limiting example, a Game Video 610 shows a five-reel video slot game. In other non-limiting embodiments, the Game Video may be video from any electronic video game, such as video reel slot games, video poker, video blackjack, video roulette, video craps, video keno, and video and electronic bingo. One skilled in the arts will appreciate that the wagering game video source could include any existing or future wagering game, including a 3D video game, dexterity-based skill games, knowledge-based skill games, lottery terminals, and the like.

A Player Tracking Video 625 is shown as a single screen with three areas of interest. First, there is a streaming video window 630 presenting some video-on-demand. Second, there is a player message window 640 presenting a welcome message to a recognized player. In one embodiment, the player is recognized by inserting his loyalty or player's club card into a card reader on the gaming machine 100. The Player Tracking Unit 140 reads the identification number and requests the player name and other player information from the slot system or CMS. Once the information has been sent to the player device, it then displays one or more messages applicable to this player, including possibly target advertisement, personal, or other messages.

In another embodiment, the Player Tracking Unit may recognize the player through a biometric face or retinal camera. Still, in another embodiment, the Player Tracking Unit may recognize the player through finger print recognition technology by either having the player touch or swipe his finger across a reader, or by having the reader embedded in another peripheral, such as a button or touch screen. The third area of interest on the Player Tracking Unit Video 625 is the remaining unused screen area 650 that has been colored Magenta.

In other non-limiting embodiments, this color could be green, blue, or any other color that is guaranteed not to show up in the other used areas of the screen. The Display Manager 200 super imposes 649 the Player Tracking Unit Video 625 on top of the Game Video 610. The resulting Shared Display 650 shows the super-imposed image including the Streaming Video Window 630, the Player Message Window 640 unchanged, and now the remaining screen which is now transparent 651, although it is Magenta on the original video signal.

In still another non-limiting embodiment, the opaque areas of the super imposed images 630 and 640 may apply a customizable level of transparency from 0% (completely opaque) to 100% (completely transparent). In another embodiment, it is advantageous and aesthetically pleasing to alter this level very quickly in a short period of time. When the level changes from 0 to 100 or alternatively from 100 down to 0, continuously or at certain values in the range, the resulting effect is for the super-imposed image 625 to fade in or fade out over the background image 610.

Figure 7:
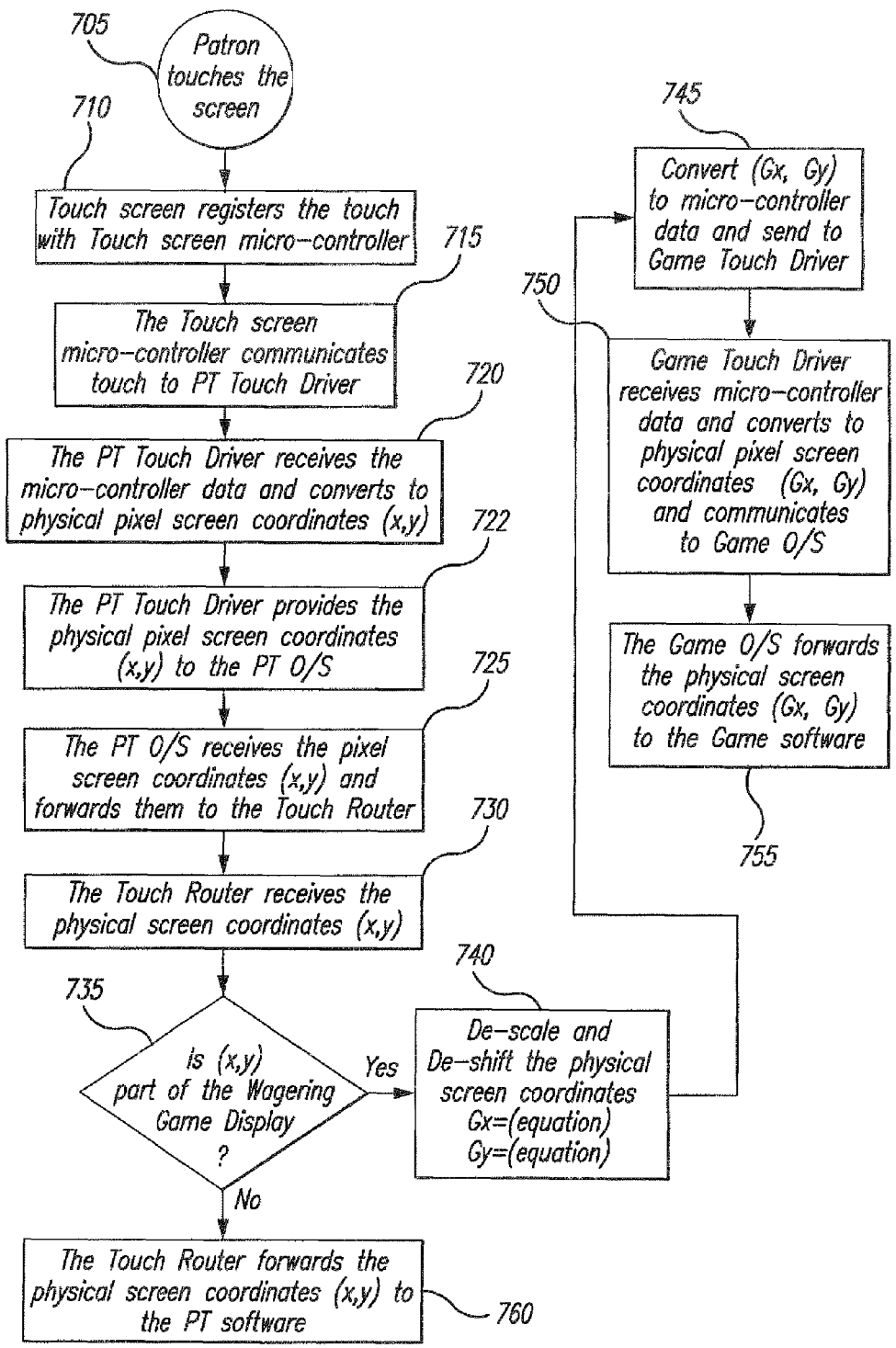
FIG. 7 is a logic diagram charting a touch screen signal from a patron's touch to the final software endpoint receiving the relative pixel screen coordinate.

Turning to FIG. 7, a flowchart is shown charting the touch screen signal from a player's touch to the final software endpoint receiving the relative pixel screen coordinate. In use, the player touches the screen 705 which is registered with the touch screen micro-controller 710. The micro-controller communicates the touch signal to the Player Tracking touch driver 715, which interprets the micro-controller protocol to calculate the physical pixel coordinates (x,y) of the touch 720. The Player Tracking Unit touch driver provides these coordinates to the Player Tracking Unit OS 722 such as Windows.

Other non-limiting embodiments associated operating systems are Linux, OSX, QNX, and MS-DOS. The Player Tracking Unit 140 O/S receives the physical screen coordinates of the touch (x,y) and forwards them to the Touch Router 725. The Touch Router receives the coordinates (x,y) 730 and makes a determination 735 if the coordinates refer to a location currently displaying video from a video source other than the Player Tracking Unit 140, e.g., a Wagering Game executing on a Master Gaming Controller 110. If the source is from an application running on the Player Tracking Unit 140, the Touch Router forwards the physical screen coordinates (x,y) to the Player Tracking Unit software 760. However, if the touch corresponds to a video signal from the Master Gaming Controller 110, the Touch Router calculates the coordinates (Gx, Gy) from the perspective of the originating video source.

In one embodiment, the game screen coordinates are calculated 740 from the scale factor (ScaleX, ScaleY) and shift values (ShiftX, ShiftY) employed to scale and shift the game video signal onto the shared display, as exemplified in FIG. 5. In this way the (Gx, Gy) coordinates would be calculated in such a way that:

$$Gx = \frac{(x - ShiftX)}{ScaleX}$$
$$Gy = \frac{(y - ShiftY)}{ScaleY}$$

The Touch Router converts the calculated coordinates (Gx, Gy) to a micro-controller protocol sent to the Game Touch Driver 745. The Game Touch Driver receives the micro-controller data and converts to the physical screen coordinates (Gx, Gy) and communicates these coordinates to the Game O/S 750. Then, the Game O/S forwards the coordinates to the Game Software 755.

In another embodiment, the determination logic 735 may be embedded in the Player Tracking Unit software managing the screen displayed in the Player Tracking Unit Video. The Player Tracking Unit software determines if the touch is on an active part of its display (e.g., a visible portion) or a non-active portion (e.g. a transparent portion or outside the range of an active display). If the touch is on an active portion, it handles the touch through its normal method. If the touch is on an inactive portion, it forwards the (x,y) coordinate to the de-scaling and de-shifting component which converts coordinates and forwards them to the appropriate device, e.g., the device providing the video source on which the player touched.

In still another embodiment, system-rendered content may be shown on a small iVIEW display (640×240) and a primary game display (main or secondary). A player may elect to have the data shown on one or both screens simultaneously. Triggering events may force the larger primary game screens to render the media to provide the best customer experience.

In some embodiments, the PIP windows may slide in or out of view when they are not needed. They may also fade in or out as needed as well. Monitored data from the game, Player Tracking Unit device or a server may trigger these windows (PIP) to appear/disappear based upon business rules or thresholds.

In some embodiments a player may reposition/resize any PIP window, and all of the other graphics will automatically or manually re-organize/rescale/resize. Player-preferred screen configurations may be saved for later use on this or another gaming machine at a later data. This configuration data is stored in a save state server and associated with a player identifier, a game identifier, and a cabinet/display identifier. A player is provided with a configuration screen to set the desired modes. Level of transparency for any and all windows is also configurable for a player and may be maintained in the save state server. A player may configure how they want to look at the game to build a fully customizable gaming experience.

There is a growing demand in the gaming environment for a video and touch screen switching hardware device, system, and/or method. An embodiment of such a device, system, and/or method mixes (e.g., switches, arbitrates, redistributes, routes, or the like) the VGA outputs from both the iVIEW (or other system gaming/Player Tracking Unit) and main game processor board to drive either or both the main game and secondary displays. Furthermore, the device would intelligently route touch screen events to either the game or iVIEW software components. The device would allow multiple windows driven by the base game and system components to simultaneously be shown on the same display(s). One embodiment of a video and touch screen switching device provides a migration strategy for current iVIEWs (or other system gaming/Player Tracking Unit) with some quick immediate modifications, and requires little or no work for gaming manufacturers to implement.

A preferred embodiment of a video and touch screen switching device maintains a wall of separation between the regulated gaming devices and their associated gaming equipment. The embodiment enables an operator to provide differentiated customer experiences on their games, and also consistent customer experience for their systems and every other part of their casino and brand. This embodiment enables the above-described, operator-desired functionality, meaning that differentiated experiences are pushed to each game manufacturer and exist on the gaming device, while consistent experiences may be implemented by a single vendor and exist on the associated equipment device, or possibly an adjunct gaming device accessory (depending on regulatory requirements). This embodiment addresses customer demands in a relatively quick manner, provides more satisfaction for the customer, and may be more palatable for other manufacturers.

Figure 8:
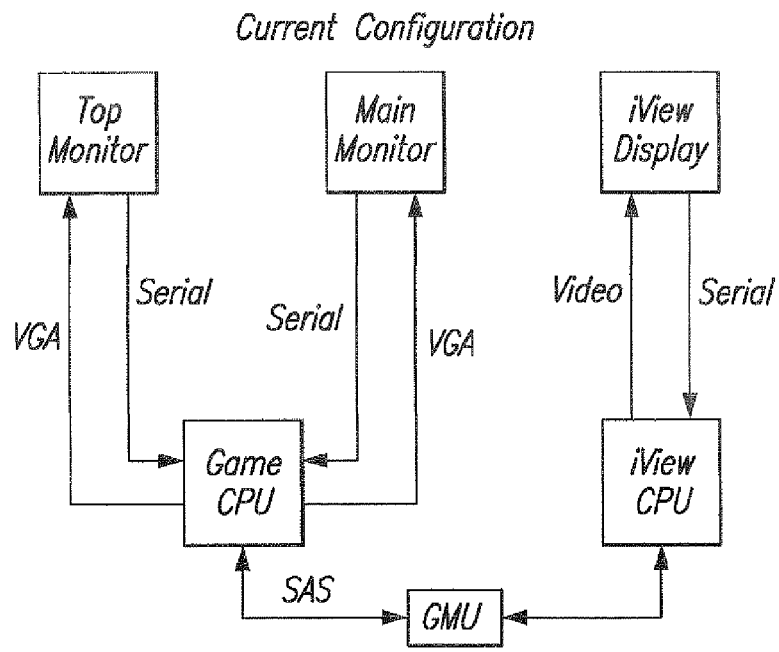
FIG. 8 is a component diagram demonstrating the current configuration of a gaming system.

One embodiment of the Display Manager (see FIG. 8) generally includes the game CPU (or Master Gaming Controller 800) connected to the main monitor 802 and/or top monitor 804 using standard VGA connection. A touch screen on either of these devices is connected to the Game CPU via a serial connection. The iVIEW processor 806 is integrated with the small 640×240 iVIEW display 808. The iVIEW has a serial touch screen. Both the Game CPU and iVIEW (or other system gaming/Player Tracking Unit) connect their audio into a separate switching device, allowing volume setting and balancing by a slot tech. A Game Monitoring Unit ("GMU") 810 is connected to the base game.

Figure 9:
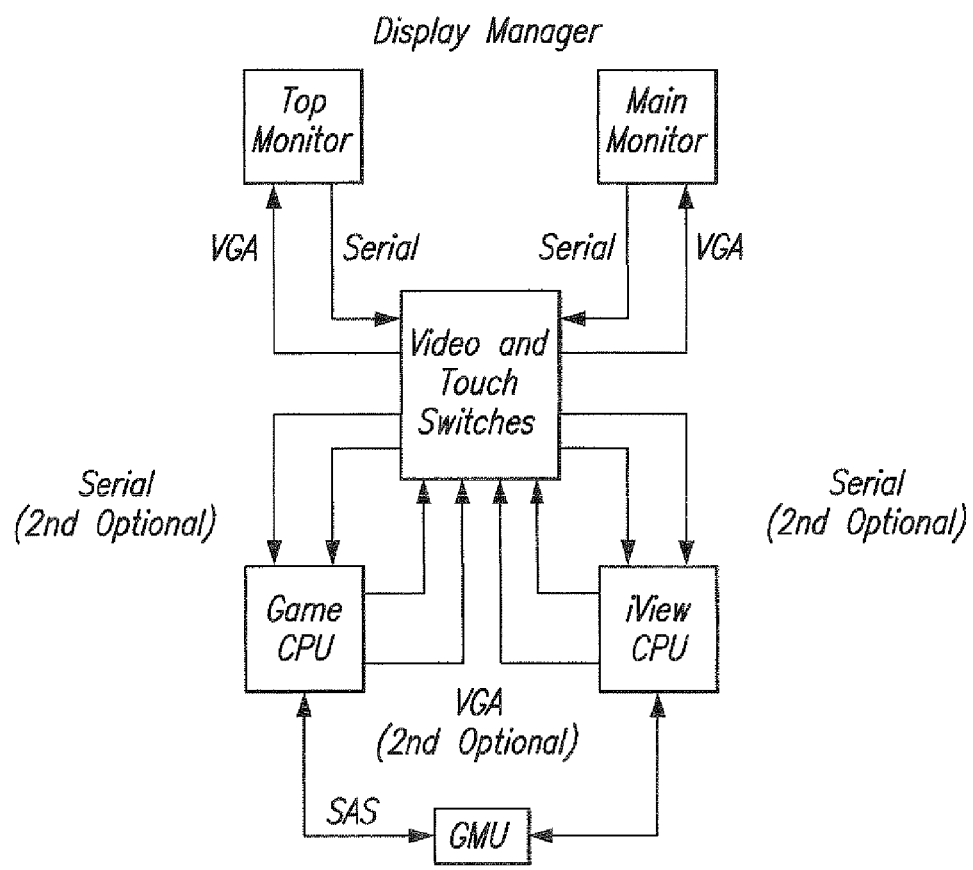
FIG. 9 is a component diagram depicting the components a Display Manager embodiment.

In one embodiment shown in FIG. 9, a Display Manager (i.e., Game/System Switcher) includes a video and touch screen switcher disposed between the touch screen displays and the Game CPU and iVIEW, allowing the Game CPU and iVIEW to effectively share the devices. These switchers may be either software or hardware. In one embodiment, a small hardware video switcher would be used along with implementing the touch switcher in software running on the iVIEW. In this embodiment, the Display Manager receives two VGA signals to be mixed and rendered, without copying and/or saving of the original signals (e.g., switched, arbitrated, redistributed, routed, or the like), to a first monitor via a first VGA output signal.

Figure 10:
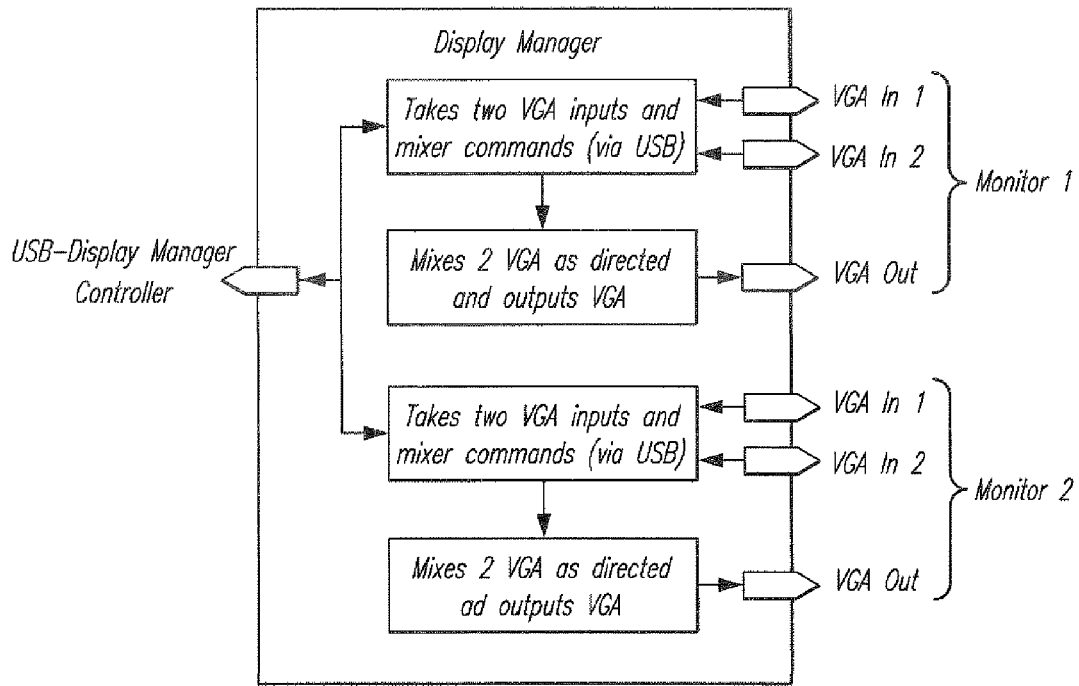
FIG. 10 is a component diagram of one embodiment of a Display Manager.

In another embodiment as shown in FIG. 10, an option is extended to two monitors. The Display Manager receives two additional VGA signals to be mixed and rendered, without copying and/or saving of the original signals (e.g., switched, arbitrated, redistributed, routed, or the like), to a second monitor via a second VGA output signal. Mixing commands may be received from the iVIEW via a USB connection.

Figure 11:
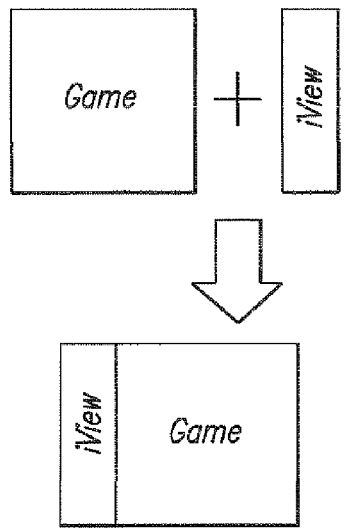
FIGS. 11-13 are diagrams of different screen splitting embodiments.

In its most simple implementation, the game content may be scaled, and iVIEW content may be placed beside it in a split screen configuration, as shown in FIG. 11. In this embodiment, the iVIEW (or other system gaming/Player Tracking Unit) instructs the Display Manager to scale the game VGA signal to allow enough room for the iVIEW content by supplying the overall coordinates (top, left, height, and width). The iVIEW then instructs the Display Manager to display the iVIEW VGA signal in the upper left corner, again by supplying the appropriate coordinates. The iVIEW has the intelligence to know the existing game state and player tracking state and may re-size, scale, or position windows based upon business rules.

Figure 12:
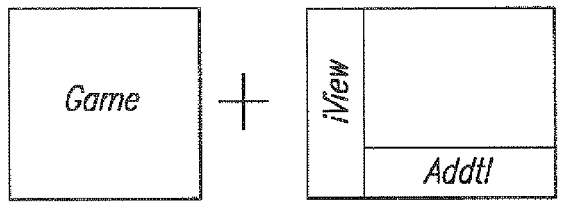
Figure 12:
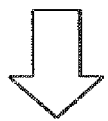
Figure 12:
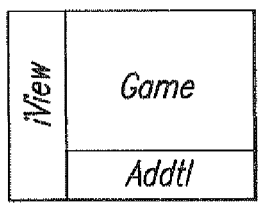

In order to preserve the aspect ratio of the game and minimize distortion, the iVIEW may accommodate a full-size screen display, leaving a space for the game content of appropriate proportions as shown in FIG. 12. This technique opens up real estate on top and bottom of the game window. The iVIEW (or other system gaming/Player Tracking Unit) then instructs the Display Manager to display the iVIEW content full screen and to overlay the scaled game window in the appropriate location.

Figure 13:
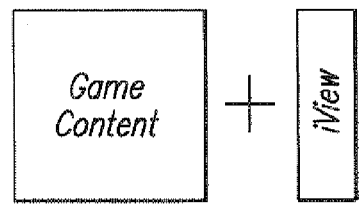
Figure 13:
Figure 13:
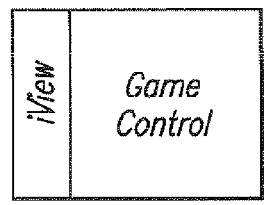

Alternatively, in another embodiment, the iVIEW (or other system gaming/Player Tracking Unit) may instruct the Display Manager to display the game content full screen and overlay the iVIEW content (e.g., System Window) on top of the game content as depicted in FIG. 13. Additionally, the Display Manager supports transparency, allowing the game content to be visible through the iVIEW content.

Figure 14:
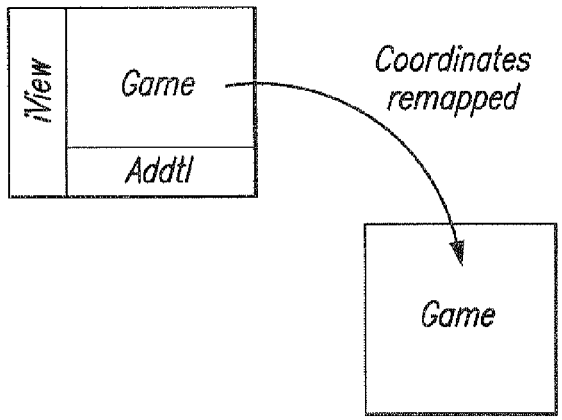
FIG. 14 is a diagram depicting re-mapped game touch coordinates.

The iVIEW receives physical screen coordinates via the standard touch screen. Using its knowledge of how the game content is positioned (since it instructed the Display Manager where to place the game content), the iVIEW may determine if the user touched the game content on the screen. Referring to FIG. 14, if the game content was touched, iVIEW passes the relative coordinates to the Display Manager, which calculates what the physical coordinates would have been if the game content had not been scaled. The Display Manager then passes these re-mapped coordinates by emulating the microcontroller of the touch screen. The touch controller is able to emulate the standard touch controllers on the floor.

The Display Manager device, system, and method disclosed herein are adaptable to the various cabinet styles on the slot floor. In the case of a video cabinet sporting a top monitor, this Display Manager may drive both monitors simultaneously, depending on the processing power and VGA connections of the iVIEW (or other system gaming/Player Tracking Unit). Referring to FIG. 15A, the Display Manager (i.e., video switcher) receives two VGA inputs from the Game CPU and two from the iVIEW and plugs into the VGA ports of both the upper and lower monitors. The Display Manager receives commands from iVIEW on how to re-render (e.g., switch, arbitrate, redistribute, route, or the like) game content or iVIEW content or a combination of both on one or both screens, possibly simultaneously. Likewise, as shown in FIG. 15B, upper and lower touch screens plug directly into COM ports on the iVIEW. The Game CPU plugs both of its serial connections into the iVIEW board. The software touch switcher on the iVIEW receives inputs from the two touch screens and sends the re-mapped coordinates to the Game CPU on the appropriate serial connection.

Driving dual monitors enables persistent secondary content to display on the top monitor (e.g. advertising, secondary games) where it is easily viewed by both the player and others that might be in the surrounding area while placing short-lived, customer interactive content (e.g., Service window menus, and the like) on the main game monitor, which is better positioned ergonomically for customers' interaction.

In one non-limiting embodiment in which the iVIEW lacks the processing power or necessary ports to drive both monitors and of a dual display cabinet, the Display Manager (i.e., game/system switcher) may be configured to drive only one of the monitors (either top or bottom). In this embodiment, the Display Manager as shown in FIG. 16A only receives the VGA input from the shared monitor and the iVIEW. The software touch switcher as shown in FIG. 16B on the iVIEW has a COM connection to the shared touch screen and a single COM connection to the Game CPU. The main monitor is still dedicated to the game by maintaining its direct VGA and COM connection to the Game CPU.

Figure 18A:
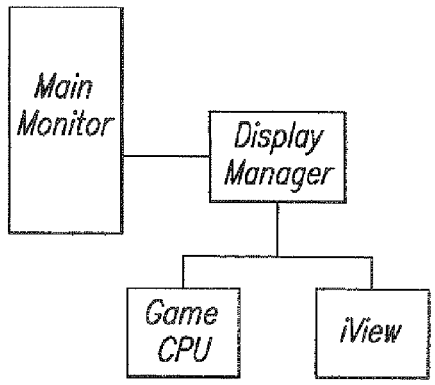
FIG. 18A is a component diagram depicting the video connectivity mapping of an embodiment including a video cabinet with a rotated widescreen monitor, where one Display Manager drives the monitor.
Figure 18B:
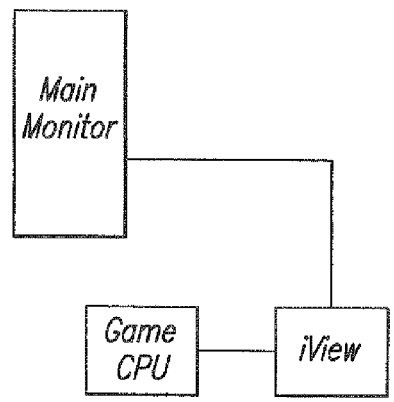
FIG. 18B is a component diagram depicting the touch connectivity mapping of the embodiment shown in FIG. 18A.

In FIGS. 17A and 17B, the case of a video cabinet with no top monitor is shown and is similar to the previous embodiment. The Display Manager is configurable to support different resolutions and aspect ratios (e.g., widescreen displays). Additionally, the unique aspect ratio is the rotated widescreen single monitor as shown in FIGS. 18A and 18B. This provides similar viewing access as a dual display cabinet on a single screen. The iVIEW (or other system gaming/Player Tracking Unit) is responsible for managing the unique "real estate" layout (i.e., the display screen area) and directing the Display Manager appropriately on where to place overlays.

Figure 19A:
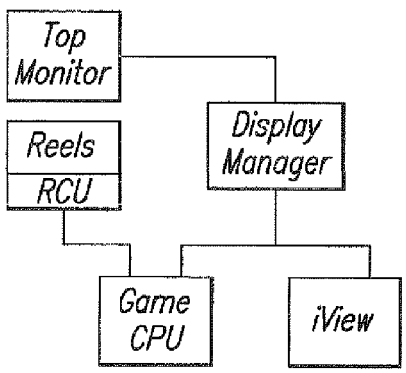
FIG. 19A is a component diagram depicting the video connectivity mapping of an embodiment including a stepper cabinet with a top monitor, where one Display Manager drives the top monitor.
Figure 19B:
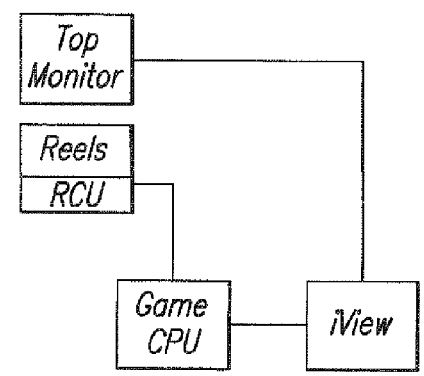
FIG. 19B is a component diagram depicting the touch connectivity mapping of the embodiment shown in FIG. 19A.

Another embodiment of a single screen solution is the stepper cabinet with a top monitor as shown in FIGS. 19A and 19B. The Game CPU maintains its connection to a Reel Controller Unit. The Display Manager (see FIG. 19A) mixes (e.g., switches, arbitrates, redistributes, routes, or the like) the Game CPU top monitor content with the iVIEW content. The software touch switcher (see FIG. 19B) sends the re-mapped touch coordinates to the Game CPU.

Figure 20A:
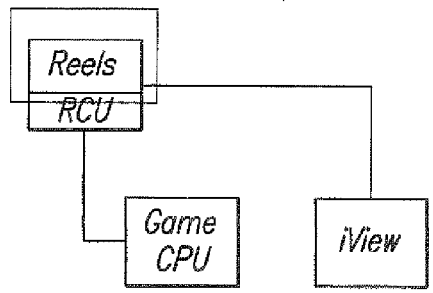
FIG. 20A is a component diagram depicting the video connectivity mapping of an overlay embodiment including a stepper cabinet with no top monitor, where an iVIEW device is connected directly to a transparent overlay.
Figure 20B:
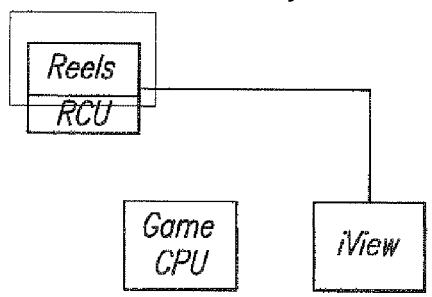
FIG. 20B is a component diagram depicting the touch connectivity mapping of the embodiment shown in FIG. 20A.
Figure 21A:
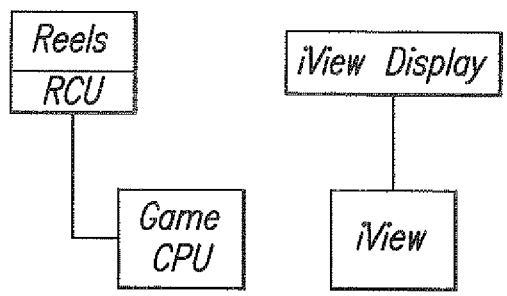
FIG. 21A is a component diagram depicting the video connectivity mapping of an embodiment including a stepper cabinet with no top monitor and having a standard iVIEW device and display.
Figure 21B:
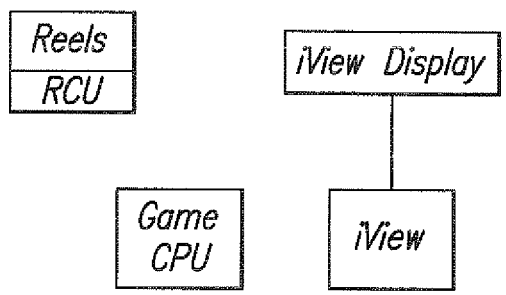
FIG. 21B is a component diagram depicting the touch connectivity mapping of the embodiment shown in FIG. 21A.

In yet another cabinet style, the stepper cabinet has no top monitor as shown in FIGS. 20A and 20B. One possible solution is to install a transparent overlay over the reels. Since the Game CPU does not have any VGA output, there is no Display Manager or video switcher (see FIG. 20A), and the iVIEW VGA connects directly to the transparent overlay. The overlay becomes a dedicated iVIEW display replacement. Likewise, there is no touch mixing (see FIG. 20B). The iVIEW simply receives the touches from the overlay touch screen. Alternatively, another embodiment for stepper cabinets with no top monitors employs the current smaller iVIEW display, which is shown in FIGS. 21A and 21B.

In a preferred embodiment of the Display Manager device, system, and/or method, the game manufacturer does not have to take any additional actions to utilize the functionality of the device, system, and/or method. In some embodiments, a few event exception codes may be incorporated to G2S (Game to System) and/or SAS (Slot Accounting System), but an immediate benefits to manufacturers is the minimization of any costly development, QA, and/or manufacturer submissions.

In one embodiment, system-related features remain with system providers, and system-only peripherals remain independent of the base Game OS. As a result, operators may continue to enjoy rapid development and deployment of system features across the floor. A single implementation of new system features continues to ensure that customer experiences are consistent, independent of various implementations and capability differences across the various devices. Remote host providers may work with a single vendor to develop and support any third-party system capabilities. A single implementation provides consistency in the capabilities in the runtime environments on the floor. A single system manufacturer may easily and more quickly define system parameters and establish agreements for ensuring content runtime environments, thereby reducing the number of variations the content developers need to develop and support.

Similarly, a single system manufacturer may control the prioritization algorithms for displaying content across the floor. Operators may work with a single vendor to ensure that high priority content is displayed appropriately, e.g., simultaneously, in a timely manner. Keeping common software infrastructure components (e.g. Flash player), potentially used by third parties, are more likely to remain up-to-date since updating them is dependent only on a single manufacturer and platform. Systems functionality remains on associated equipment reducing the risk increased regulatory overhead. Additionally, new cabinets are not required for customers to benefit from this technology.

The Display Manager offers benefits to the operators and industry. Depending on desired capabilities, this embodiment provides the operator with a migration strategy and the opportunity to preserve a portion of their investment in iVIEWs (or other system gaming/Player Tracking Unit) that they currently own. The existing board supports basic single-display mixing (e.g., switching, arbitrating, redistributing, routing, or the like).

Figure 22:
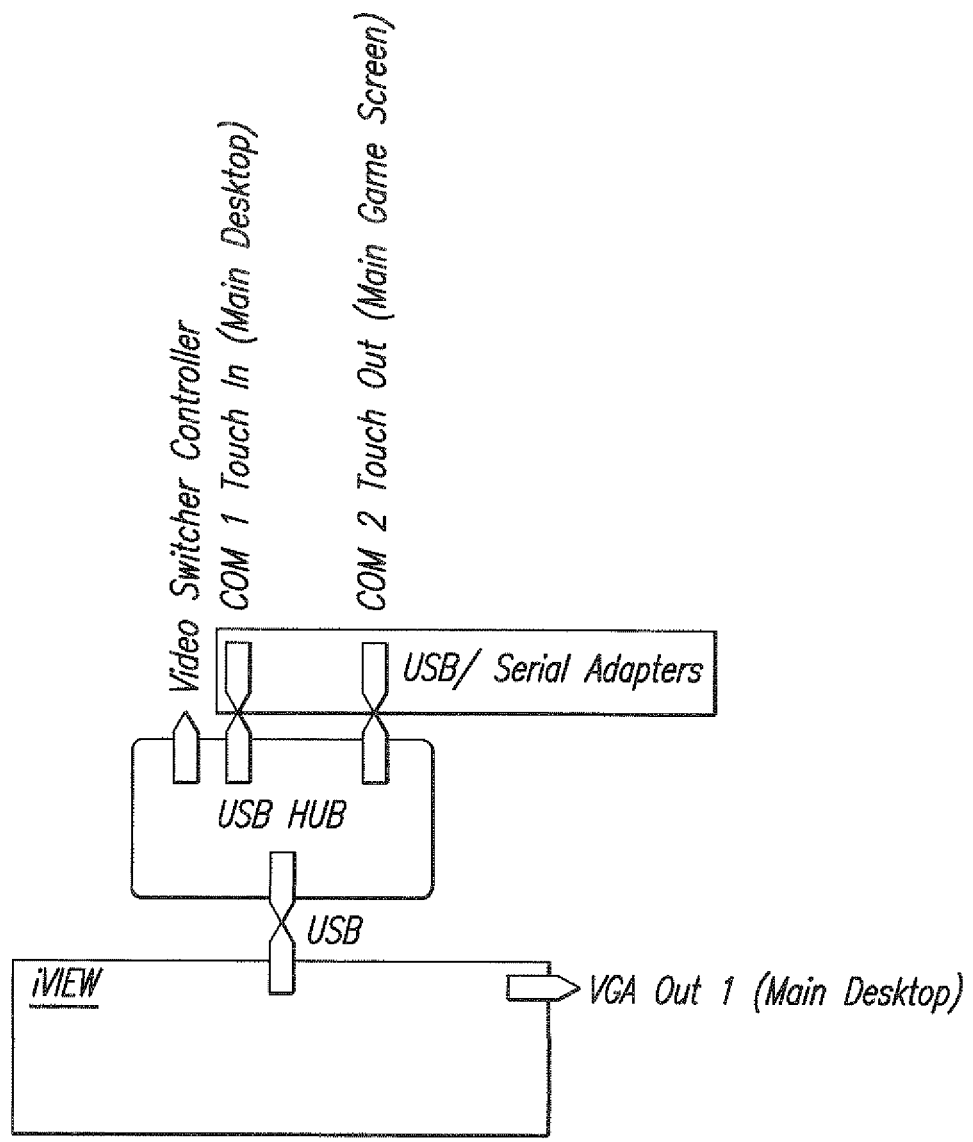
FIG. 22 is a component diagram of an embodiment of an iVIEW.
Figure 23:
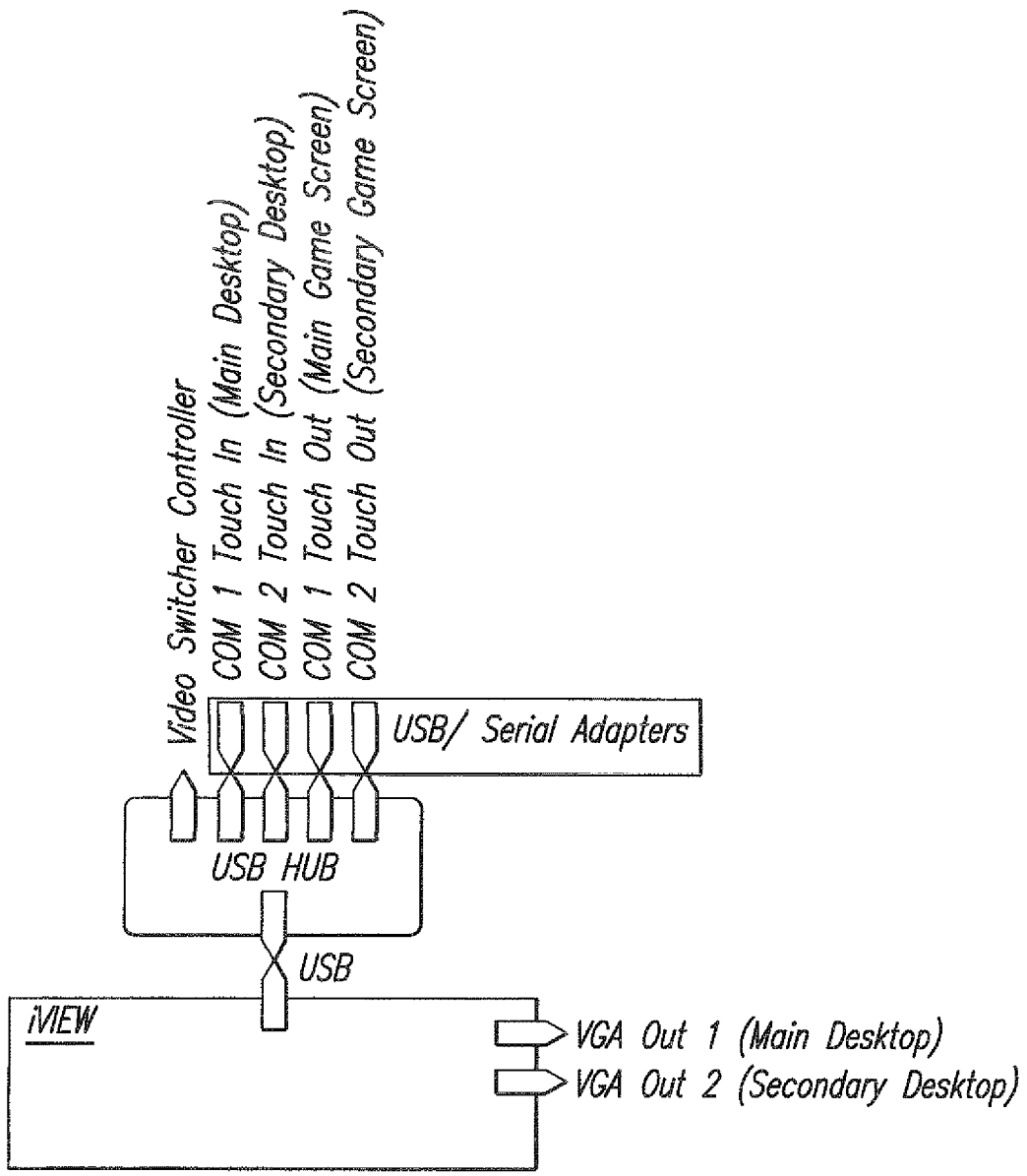
FIG. 23 is a component diagram of an embodiment of a fully-featured iVIEW with two VGA outputs.

An operator may upgrade any currently owned iVIEW (See FIG. 22) to provide a game monitor system window, a top monitor display, or both. As a result, the operators do not need to decide whether to purchase iVIEWs (or other system gaming/Player Tracking Unit) today or wait for a shared display solution. When the shared display solution is available, or otherwise timely to acquire, they may upgrade their machines, not only avoiding the full cost of the new capability, but also possibly extending the life of their exiting iVIEWs' processor. Once enhanced system gaming/Player Tracking Units are available (See FIG. 23), operators may purchase those on new machines moving forward.

Figure 24:
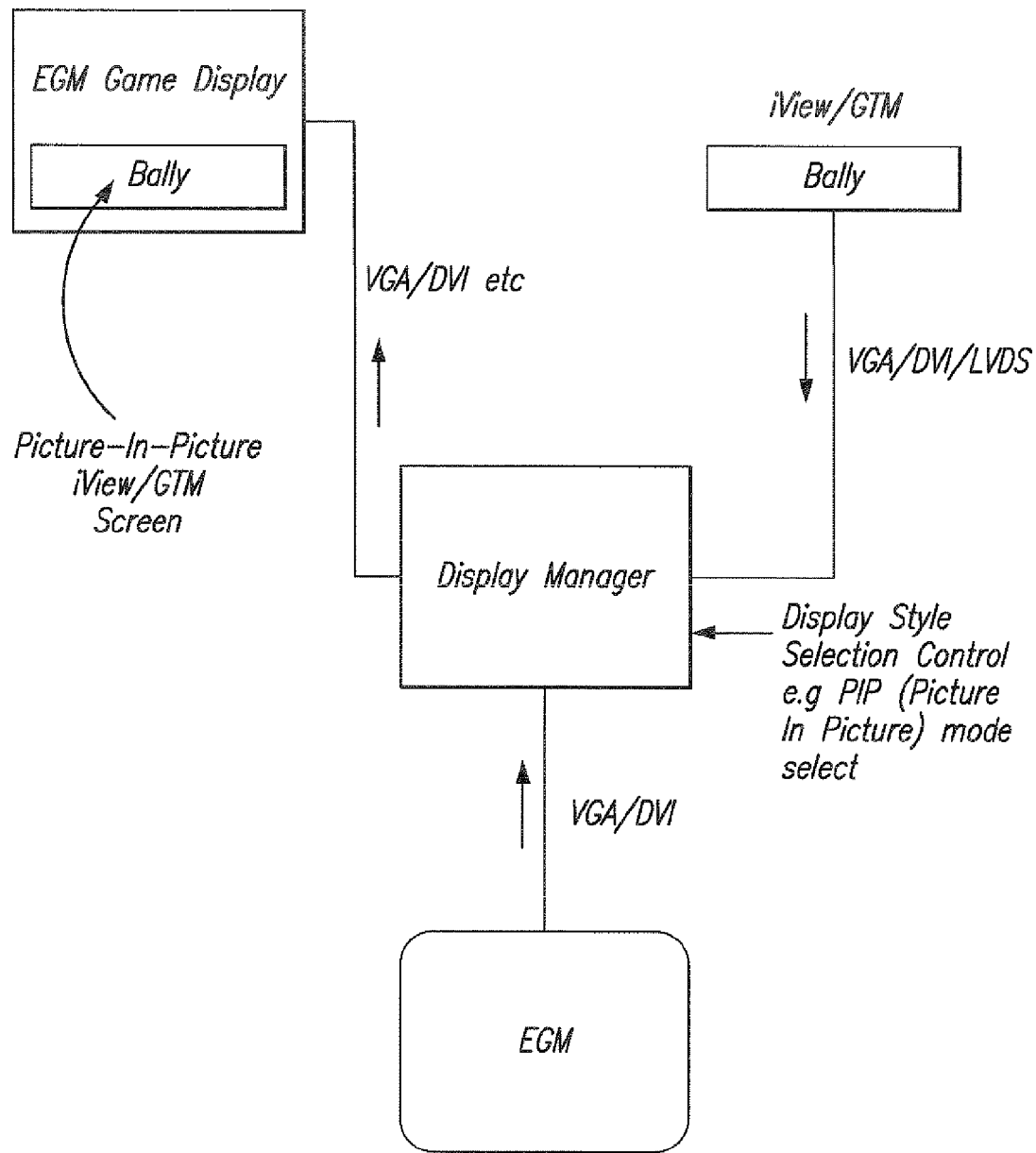
FIG. 24 illustrates a Display Manager combining the screen content from two or more sources without affecting the physical construction of the devices connected thereto.

Referring now to FIG. 24, in another embodiment, the Display Manager combines the screen content from two or more sources without affecting the physical construction of the devices connected to it. The mixing mode of the input screens depends on an external input using a USB or serial interface. Preferably, a Display Manager is an image processing unit that has two or more VGA/DVI (and possibly LVDS) inputs and a VGA/DVI output. Additionally, the mode select is another control input to the Display Manager that also acts as an input for dynamic size change commands. The Display Manager may utilize USB, RS-232, or another suitable protocol. The above-described input path may also be utilized for the upgrading of the Display Manager. In another embodiment, a coaxial input may be used to feed a Television/Tivo/DVR (digital video recorder) signal directly into the Display Manager.

In one such embodiment, the basic construction of the Display Manager is shown in FIG. 24. Specifically, the Display Manager may be used to generate a Picture-In-Picture mode. The common display is currently showing the gaming machine screen. The iView/GTM (Game Terminal Manager) has an important message that needs to be displayed on the main screen. A screen display mixing style PIP (Picture-In-Picture) is selected using the USB/Serial interface. The Display Manager combines the signal, performs the required image processing, and then provides the input to a common display. The common display shows the main game with a PIP of the iView/GTM message screen. The size of the PIP screen may also be dynamically changed using the selection input.

In such an embodiment, the control input may be used for screen mixing selection or for the size of the effects. For example, the screen mixing selection may be used with any of the following styles: PIP, POP (Picture-on-Picture), dissolver, fader, and vertical/horizontal/multimode screen splitter. Additionally, the size of the effects may be varied (e.g., the split screen or the PIP image size and position may be dynamically changed using the control input). Moreover, the Display Manager may be extended to more than two inputs so that a third input from a standard TV/Tivo/DVR may be connected to use any of the mixing styles for display on the main screen.

In a preferred embodiment of the Display Manager, display mixing effects may be implemented without any modifications to the current gaming machine or GTM hardware. Both the GTM and the gaming machine do not require any additional software changes other than the mode control. Even this change may be eliminated if the mode is a fixing mode (e.g., only PIP). Additionally, the Display Manager simplifies the implementation of the display mixing in all currently-existing filed hardware, because only a simple VGA cable has to be connected to the Display Manager instead of the gaming machine.

Referring now to the Display Manager software and configuration, the Display Manager operating system and content include right and bottom display panels. The operator has the option to select a panel that best suits the base gaming machine. The operator changes the screen configuration by entering the employee page and selecting the "Change DM Config" button.

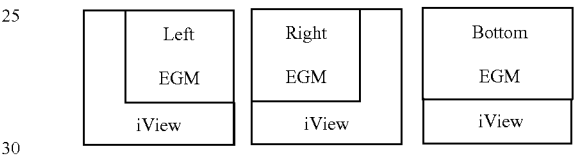

In one embodiment, an iVIEW controls the touch screen remapping of the gaming machine and iVIEW, as well as controlling the Display Manager. The Display Manager mixes the video outputs from the iVIEW and the main gaming controller, and displays the combined image on the game screen. The iVIEW OS controls the screen layouts via serial link to the Display Manager board.

Preferably, the iVIEW board performs touch screen remapping of the gaming machine and iVIEW screen. Touch screen inputs from the video area corresponding to the main game are routed to the game and inputs from the iVIEW area are routed to the iVIEW application. The touch screen management is performed by the iVIEW using a USB to Serial Port Converter. This system is compatible with the existing SDS (Slot Data System) environment and does not require modification to the main game OS.

In one embodiment, the GTM iVIEW operating system in the SD card is Microsoft Windows CE. The SD card also holds the iVIEW content, which may be customized for advertising, messages to the player or other casino-designed promotional messages. The minimum recommended compact flash size is 256 MB. The content or Operating System (OS) can be updated by replacing the GTM SD card.

Both the operating system and content are signed and authenticated. The GTM iVIEW hardware verifies the signatures of the OS and content. Additionally, the GTM iVIEW launches the operating system and application after the files are verified. If any of the files on the SD card are modified, the GTM iVIEW displays an error screen upon boot up. The casino may modify the content file (manufacturer folder in the SD card) but the new content must be resigned using the manufacturer DSA file signer (Level III signing). The operating system files may not be modified by the casino.

In one embodiment, the SD card content enables players to insert their cards to activate a standard player screen and request services, assistance, or other information with unavailable/non-supported items being "grayed out." The employee card activates a standard interface screen with associated operator, regulator, and diagnostic/installation functions.

In one non-limiting example, the interface with the Gaming Monitoring Unit (GMU) software is consistent using previously used interfaces. The GTM iVIEW uses a standard EPI port to connect to the GMU. Neither the GTM iVIEW Operating System, Application, nor Content modify the meters or the accounting information stored and processed by the GMU.

This embodiment is compatible with (1) Capstone Display Manager Board with OS version fli8548_RD4_board_ext_v7.hex; (2) SDS 8.2.X or higher; (3) MC300 Game Monitoring Unit with ECO 2103 or higher; (4) iVIEW Sound Mixer (GLI file number SY-22-SDS-06-14); and (5) GTM iVIEW touch screen display. Additionally, this embodiment introduces various enhancements and features, including (1) right and bottom Display Manager display screens; (2) new employee functions to select the left, right, or bottom Display Manager display screens; and (3) support for additional video resolutions (VESA-compliant; 640×480 to 1280×1024), video refresh rates (50 hz to 85 hz), video output (VGA and DVI), and touch screen serial interfaces (3M EX-II).

The Display Manager is a hardware component that mixes the iVIEW content and the game content and then displays the mixed content on the gaming machine's monitor-touch screen. Mixing the content for both the game and the iVIEW onto one screen provides players easier access for downloading credits from their accounts without interruption of game play or access to other player functions. The hardware component is installed between the iVIEW display and the gaming machine's monitor-touch screen.

In one embodiment, the following hardware and software are installed to connect and run the Display Manager feature: (1) iVIEW GTM (206978) with video pigtail (206970-00-0) and (2) DM operating system (OS). Additionally, in one embodiment, installation of the Display Manager uses the following components: (1) three USB Cables; (2) two USB to Serial Connectors; (3) USB Hub; (4) one Display Manager with VGA to DVI Converter, including a DVI cable; (5) one RS232 Serial Cable, Molex 8-pin from iVIEW J2 to 9-pin serial on the Display Manager; (6) one RS232 Cable USB Hub to monitor touch screen; (7) three VGA Cables (iVIEW VGA OUT to DM VGA to DVI converter IN, gaming machine Processor Board VGA OUT to DM VGA IN, and DM VGA OUT to gaming machine Monitor VGA IN); (8) one RS232 Null Modem Cable (USB Hub to gaming machine processor board touch screen 9-pin serial connector).

In another aspect of one embodiment, the Display Manager operating system (OS) and content held on the iVIEW SD card are upgraded when installing the Display Manager software. Typically, this is performed by inserting the SD (Secure Digital) card into the SD socket on the iVIEW.

Further, in one non-limiting embodiment, the Display Manager hardware is installed by plugging each cable into the appropriate connector on each piece of hardware as follows: (1) USB cable from iVIEW USB Host to USB Hub; (2) USB cable/serial to USB converter connector from USB Hub to RS232 cable to monitor touch screen; (3) USB cable/serial to USB converter connector from USB Hub to RS232 Null Modem cable to game machine processor board DB9 touch screen connector; (4) iView VGA OUT to Display Manager DVI converter box VGA IN port; (5) iVIEW RS232 to Display Manager serial 9-pin; (6) gaming machine VGA OUT to Display Manager VGA IN; (7) Display Manager VGA OUT to monitor VGA IN; (8) DVI cable from Converter OUT to Display Manager Converter IN (Converter dipswitches 1, 5, and 10 should be in the ON position).

Figure 25:
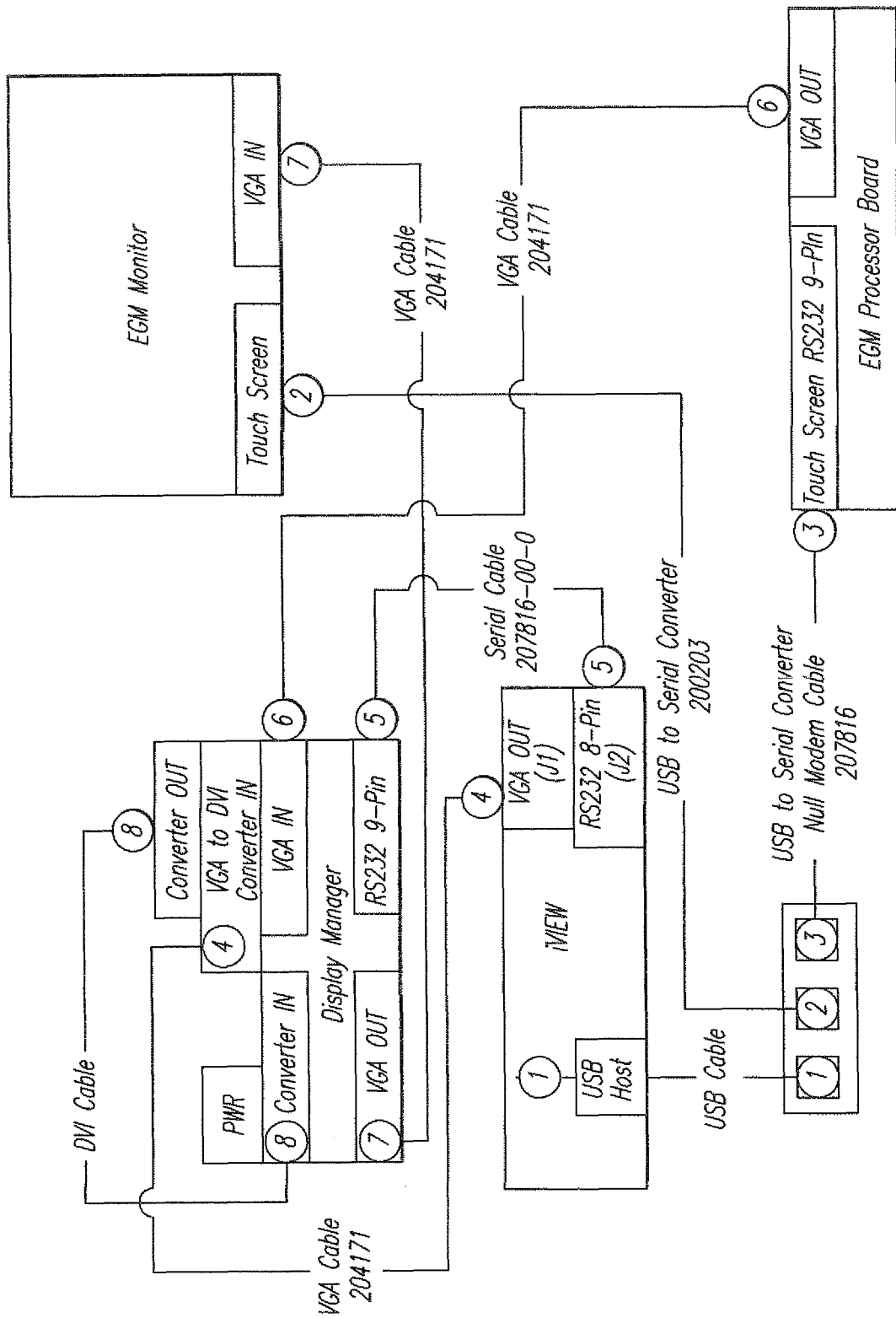
FIG. 25 illustrates installation and configuration of the Display Manager software and hardware.

Referring now to FIG. 25, after the Display Manager software and hardware have been installed, the gaming screen is then configured. In one embodiment, the configuration is performed by accessing the employee mode to calibrate the touch screen. Specifically, the touch screen is calibrated by accessing the employee mode, selecting touch screen calibration, and following the instruction prompts on the monitor for calibration.

Figure 26:
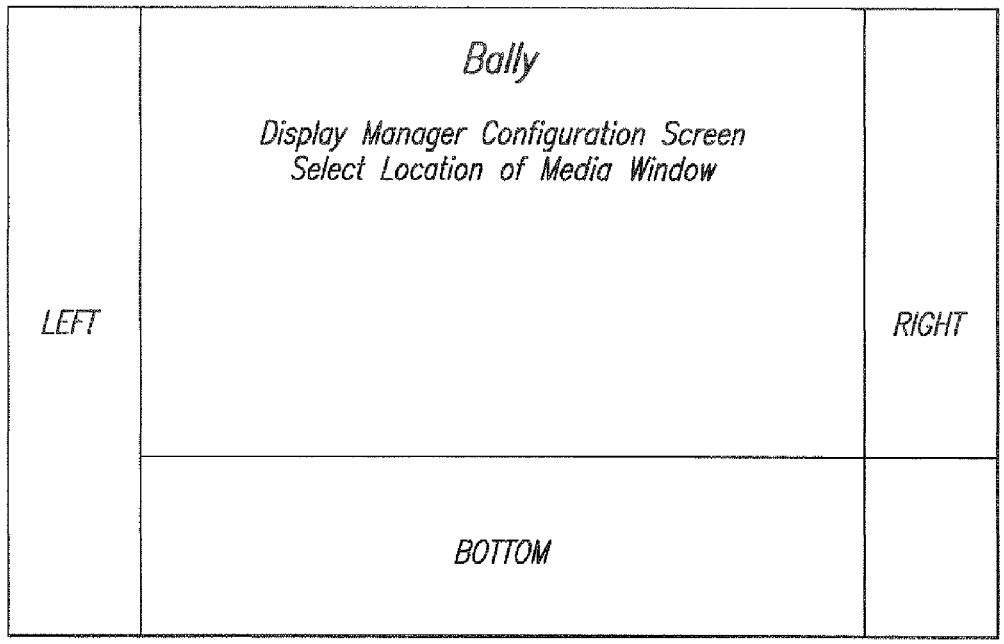
FIG. 26 illustrate Display Manager configuration screens.
Figure 26:
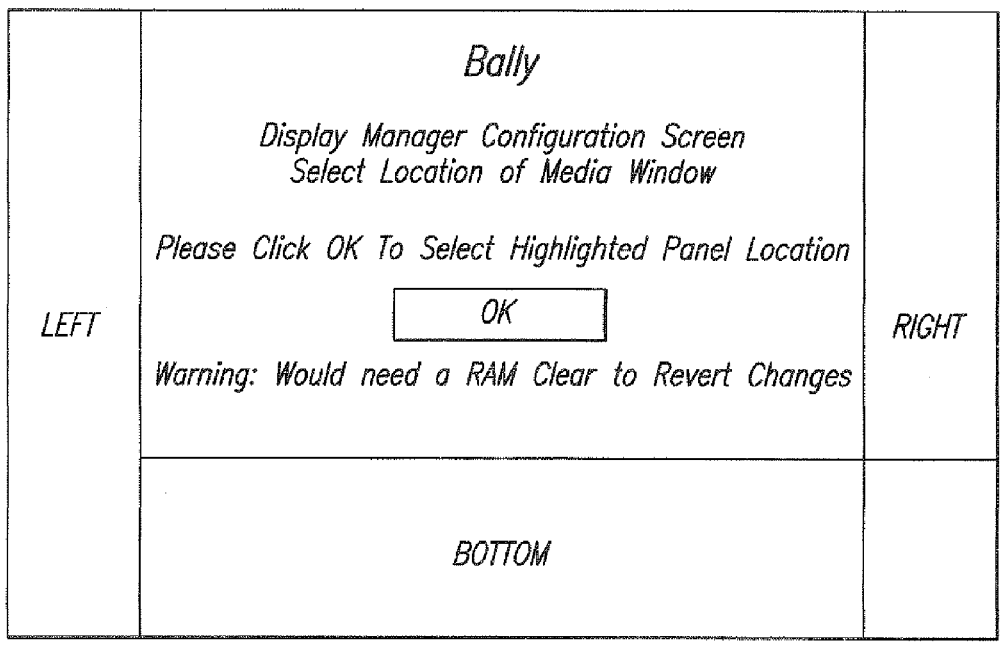

As shown in FIG. 26, a user (1) accesses the employee mode, (2) selects the Display Manager Configuration Screen, and (3) touches the area of the screen where the menu is to display. The typical configuration for video gaming machines is as follows: —For the Left: Bottom bar is always on. The Menu displays on the left side. The game shrinks to fit the upper-right. For the Right: The bottom bar is always on. The Menu displays on the right side. The game shrinks to fit the upper-left. For Spinning-Reel machines, select Bottom. After the settings have been selected, touch OK to save the settings.

Figure 27:
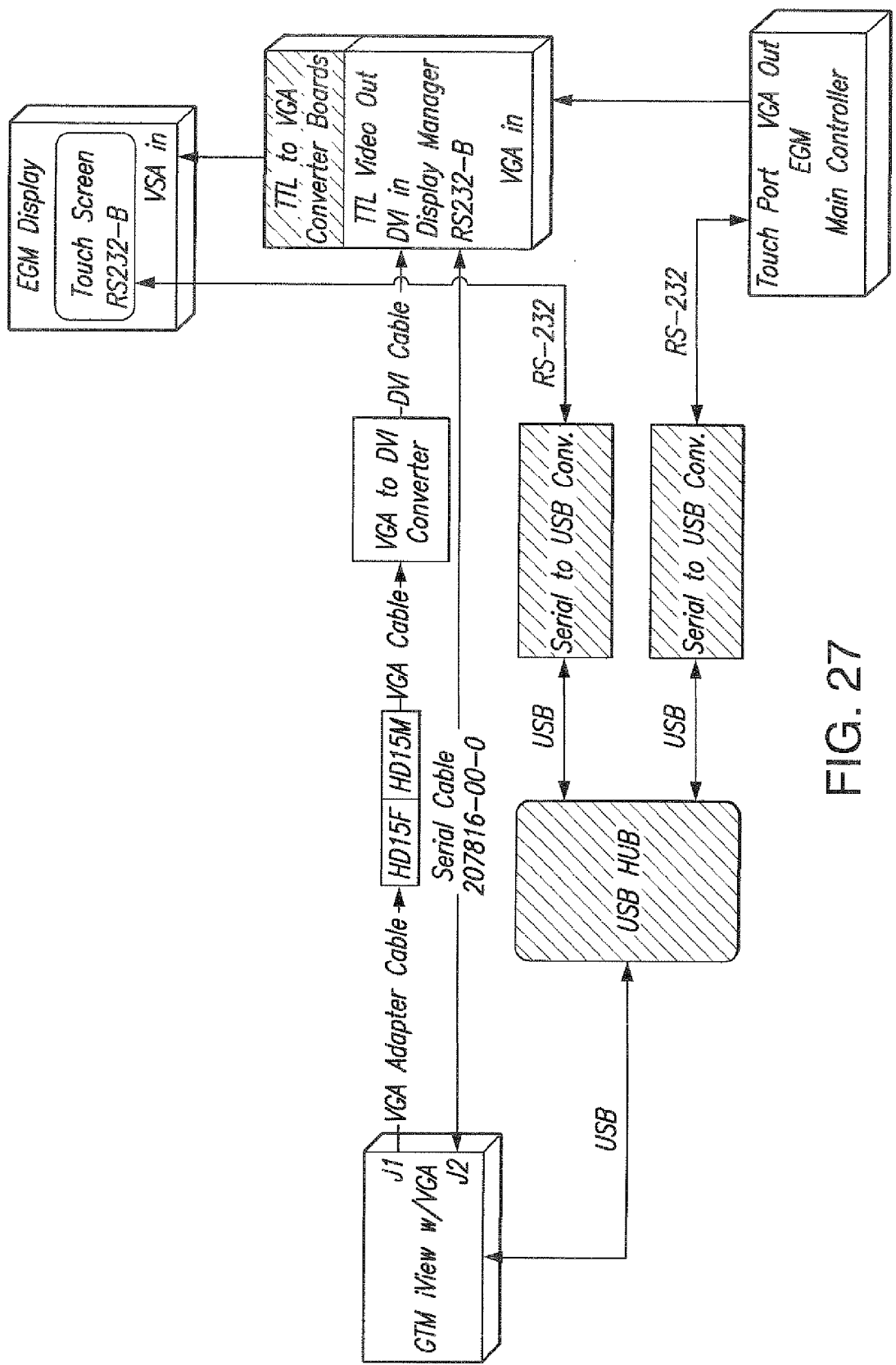
FIG. 27 illustrates a component diagram of the Display Manager shown in connection the Master Gaming Controller, the GTM iVIEW, and the gaming machine display screen.

Referring now to FIG. 27, a component diagram of the Display Manager is shown in connection the EGM main controller (Master Gaming Controller), the GTM iView, and the gaming machine's display screen (EGM display). Additionally, at least one possible non-limiting embodiment of the wiring of these components is shown. In another embodiment, the Display Manager is configured to support DVI & VGA on both inputs and output, eliminating the external TTL & DVI converters. In still another embodiment, touch scaling is incorporated into the Display Manager board, thereby eliminating the USB hub and serial-USB converters.

In yet another embodiment, Genesis FLI8668 scaler chip is used instead of the FLI8548 scaler chip. The Genesis FLI8668 scaler chip is more powerful and can support higher resolutions and more flexible PIP options. The FLI8668 scaler chip provides high integration for advanced, dual-channel applications of Picture-in-Picture (PIP) and Picture-by-Picture (PBP). Specifically, two videos decode with 3D comb filters and two channels of DCDi (Directional Correlation Deinterlacing) processing, and true 10-bit performance provides an extreme high-quality picture for a two-channel application.

Additionally, the FLI8668 scaler chip provides special performance features such as the Faroudja DCDi Cinema video format converter, blue stretch, DDR memory with a read-write of 10 bits per pixel, and flexible sharpening algorithms providing unparalleled performance. The FLI8668 scaler chip also includes an integrated Analog Front-End (AFE) that includes two triple ADCs, a cross-point switch, and two Faroudja Intellicomb™ 3D comb filters. The flexible AFE ensures simple PCB design with direct connections to TV tuners and input video connectors.

Genesis Microchip Inc., the maker of the Genesis scaler chip has been acquired by STMicroelectronics (NYSE: STM). Worldwide Headquarters located at STMicroelectronics, 39, Chemin du Champ des Filles, C. P. 21, CH 1228 Plan-Les-Ouates, GENEVA, Switzerland. One of ordinary skill in the art will appreciate that other equivalent (or better) scaler chips may also utilized without departing from the scope of the invention.

Figure 28:
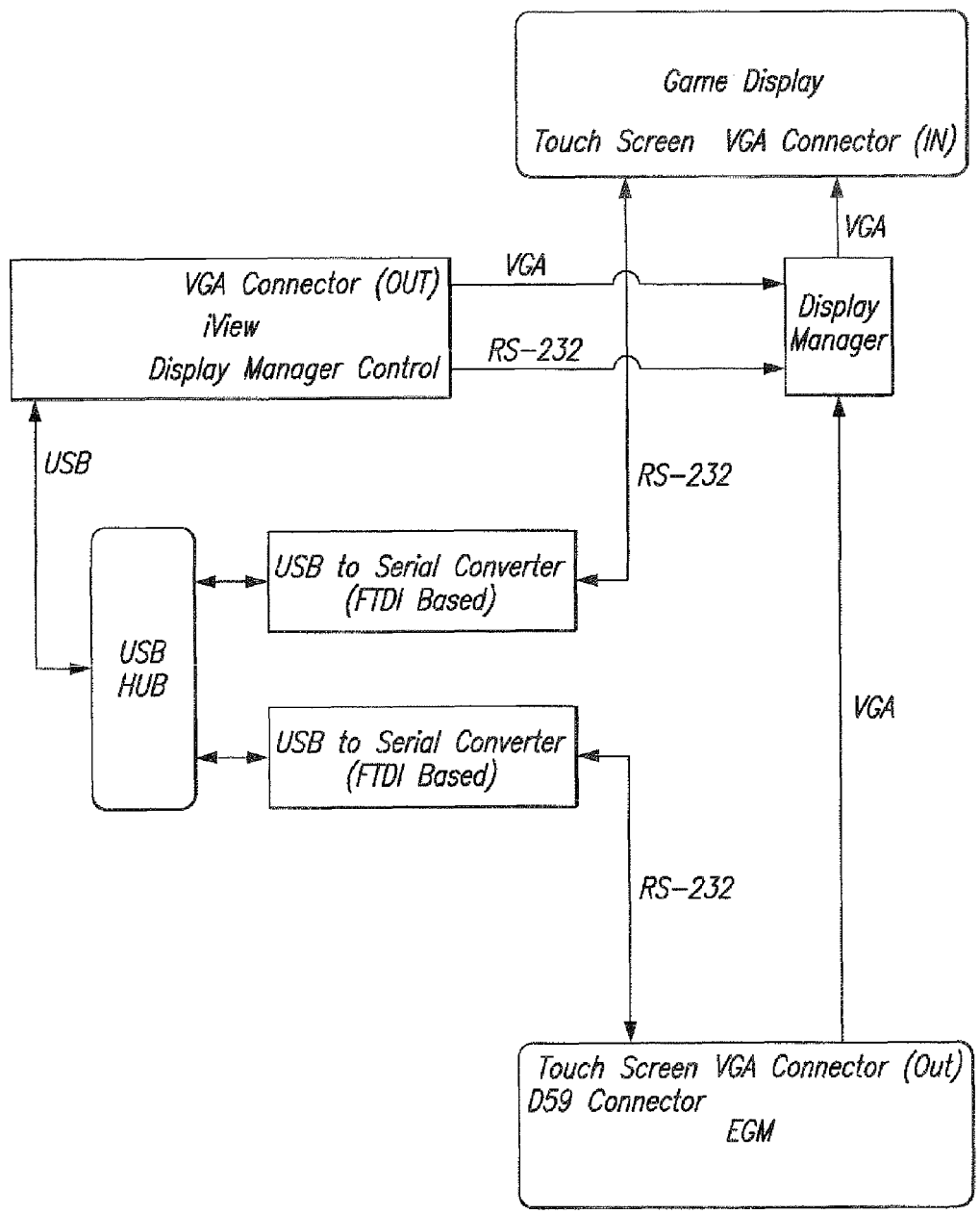
FIG. 28 illustrates a video connection and the touch screen control diagram of the Display Manager shown in connection the Master Gaming Controller, the iVIEW, and the Game Display.

Referring now to FIG. 28, a simplified component diagram of the Display Manager is shown in connection the EGM main controller (Master Gaming Controller), the iView, and the Game Display. The component diagram shows both the video connections and the touch screen control.

Figure 29:
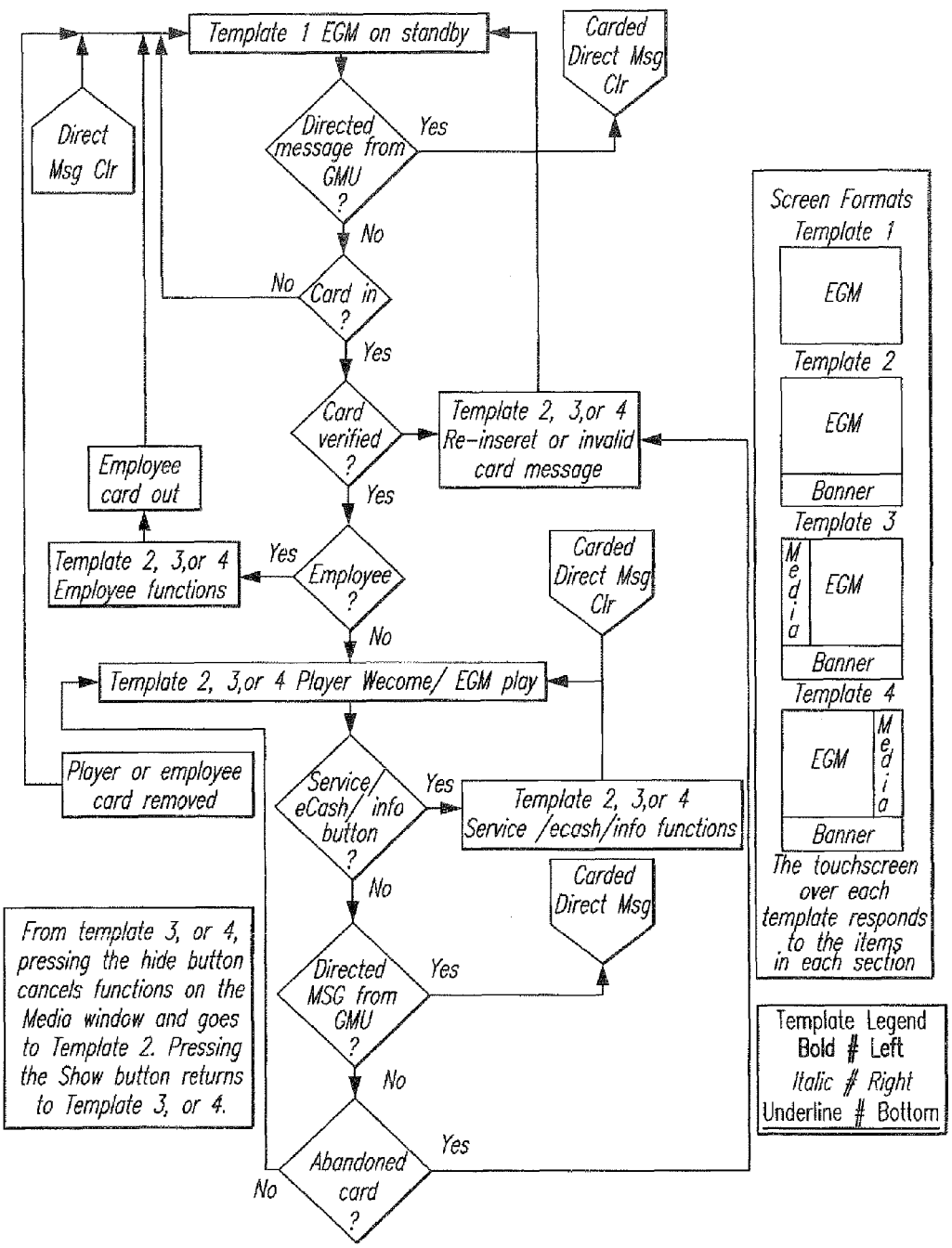
FIG. 29 is a logic flow diagram illustrating the Display Manager's basic functions.
Figure 30:
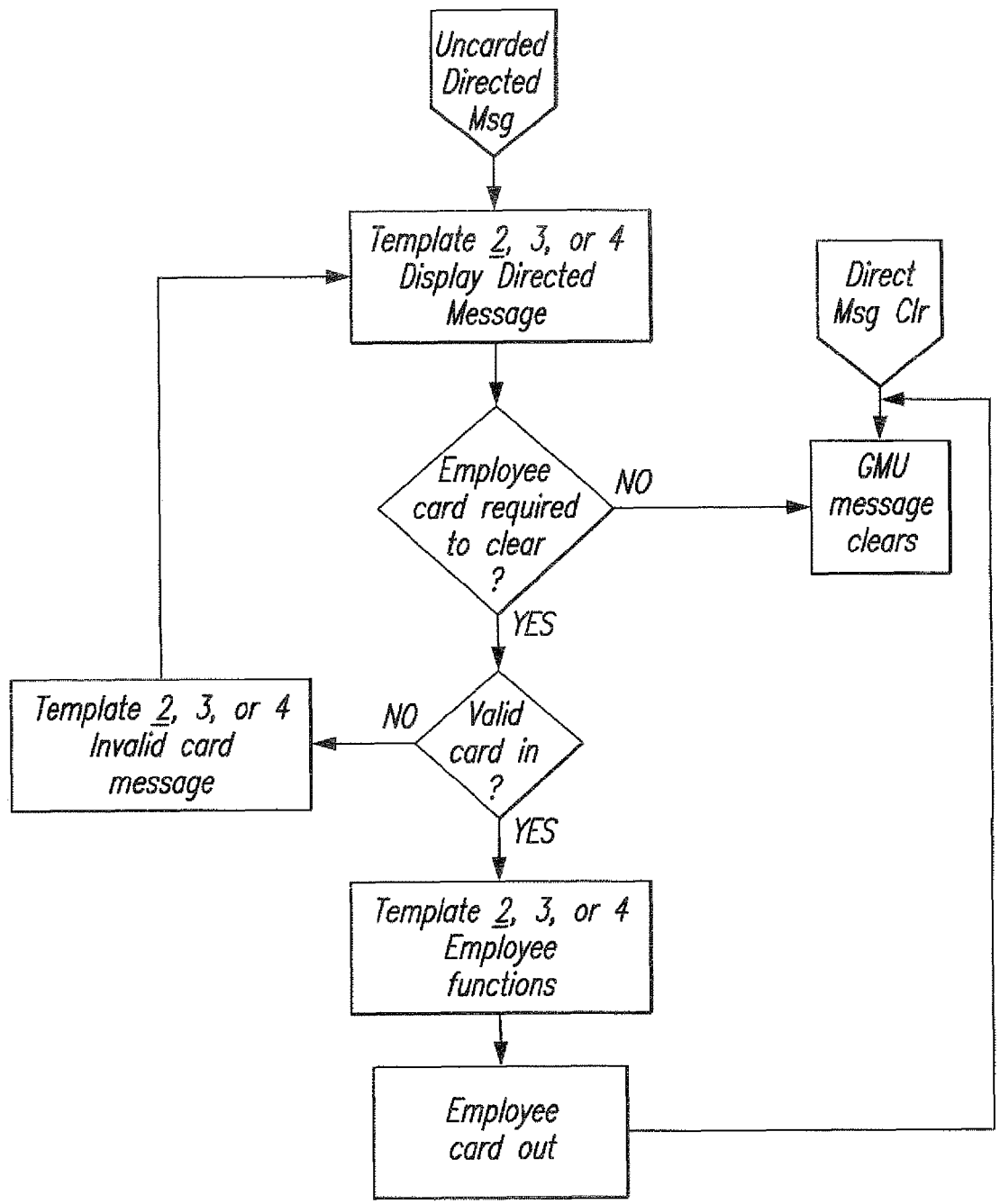
FIG. 30 is a logic flow diagram illustrating uncarded direct messages using the Display Manager system.
Figure 31:
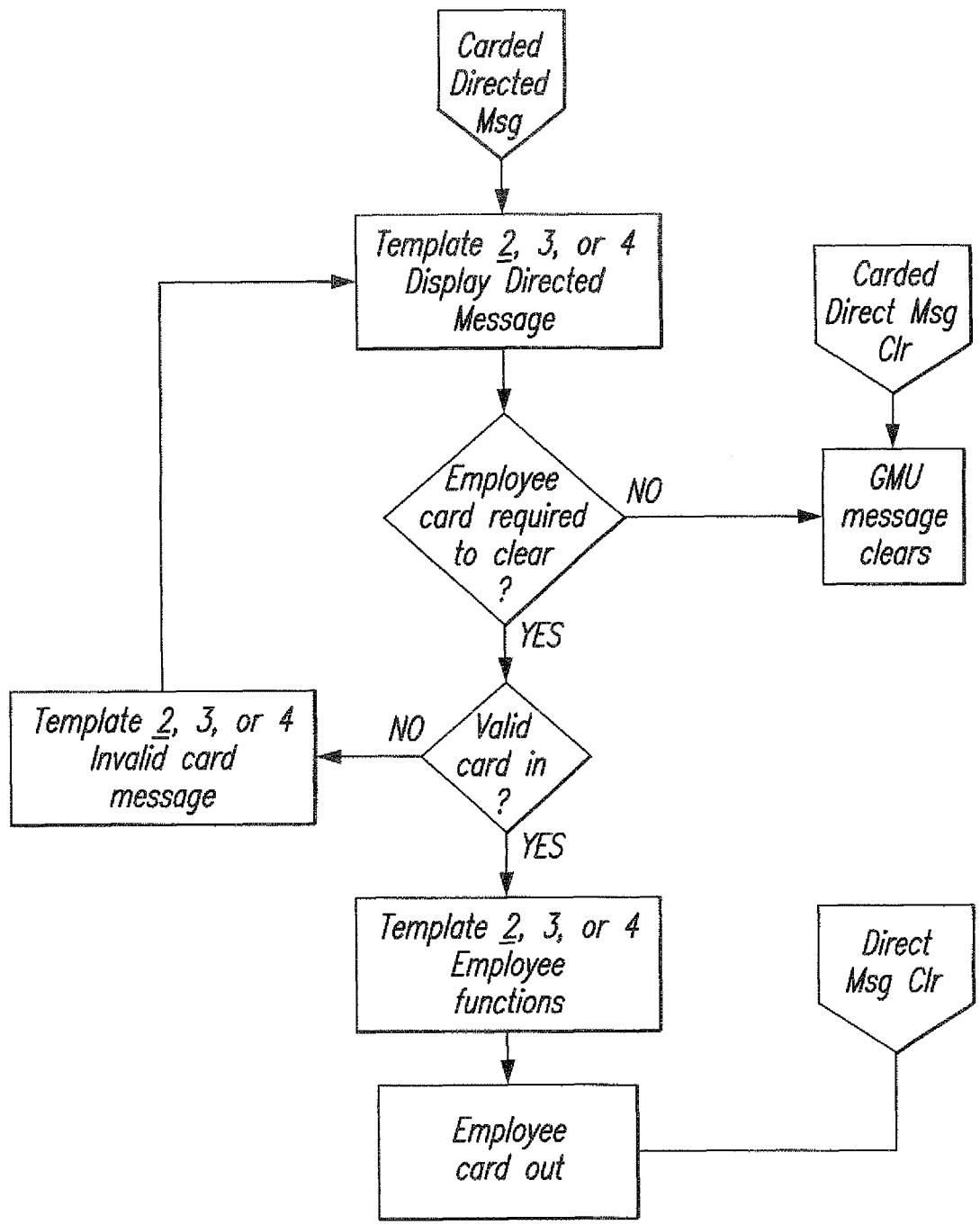
FIG. 31 is a logic flow diagram illustrating carded direct messages using the Display Manager system.

Referring now to FIG. 29, a logic flow diagram is shown of the Display Manager's basic functions. As shown in FIGS. 30 and 31, a logic flow diagram of uncarded direct messages using the Display Manager system is disclosed (FIG. 30) and a logic flow diagram of carded direct messages using the Display Manager system is disclosed (FIG. 31).

Figure 32:
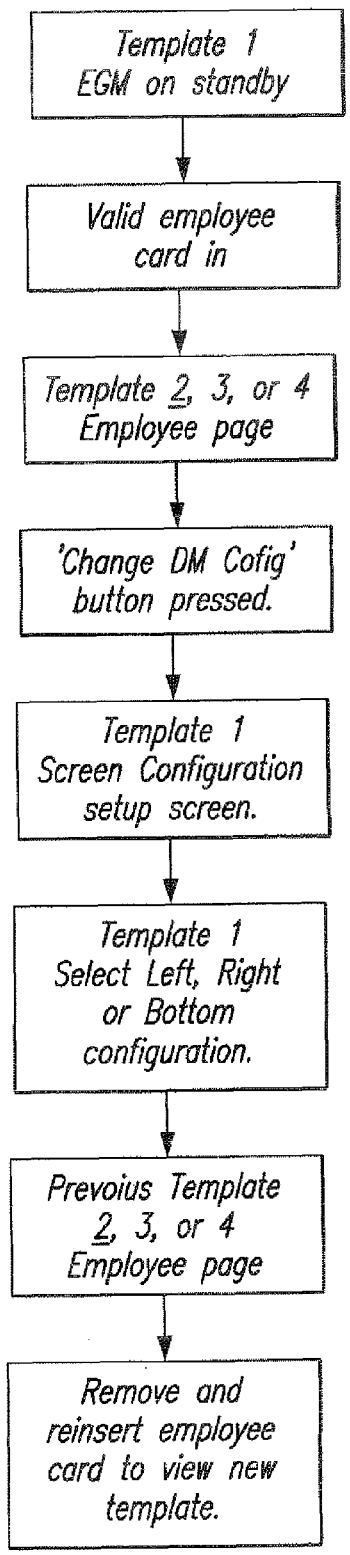
FIG. 32 is a logic flow diagram illustrating the additional Display Manager functions.
Figure 33:
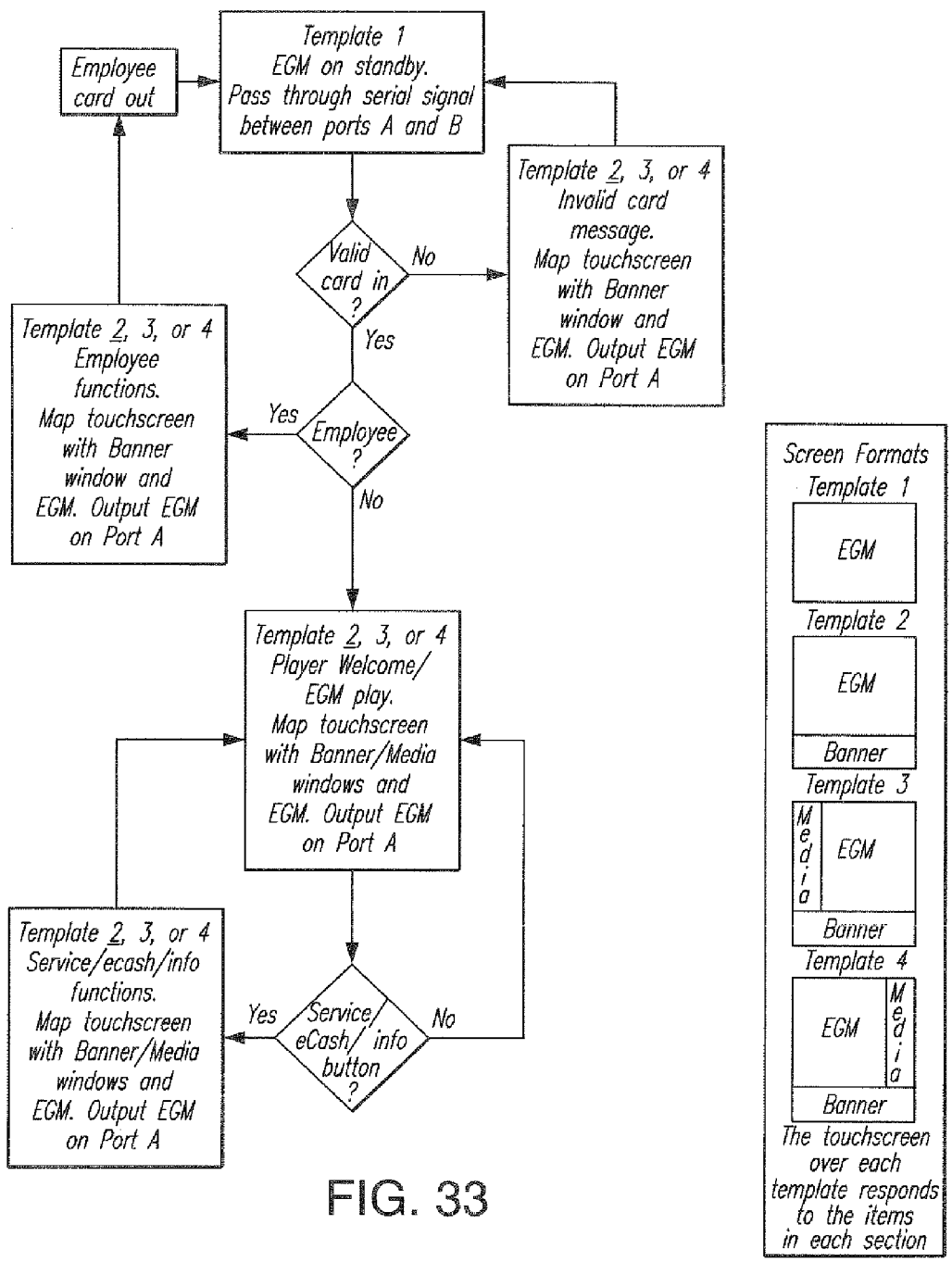
FIG. 33 is a logic flow diagram illustrating the additional serial touch screen functions.

Referring now to FIG. 32, a logic flow diagram is shown of the additional Display Manager functions. Additionally, with reference to FIG. 33, a logic flow diagram of the additional serial touch screen functions is disclosed.

Turning to FIGS. 1 and 34-36 embodiments of the method, system and apparatus for tuning a video switching device ("Display Manager") according to the present invention will now be described. Upon boot up of a gaming machine 100, for example, the master gaming controller 110 will send first video content of a first characteristic to the Display Manager 200. As described above the Display Manager 200 is configured to mix video signals from the Master Gaming Controller 110 having first content and first video signal characteristics with video signals from a second source such as the associated equipment Player Tracking Unit 101 or from a network source. With legacy gaming machines 100 the first video signals the Display Manager 200 may not recognize the signal characteristics. Namely the scalar chip for the Display Manager 200 may not recognize the first video signals sufficient to scale the video stream to properly match the margins with the margins of the video display such as the Main Game Display 120. In the past, when this has occurred an error message is rendered. The remedy was to de-construct the first video signal timing characteristics and to alter the firmware of the Display Manager 200 to recognize and properly scale the video signal stream to the margins of the receiving video display such as the Main Game Display 120 or Secondary Display 130. Reconfiguration of the Display Manger 200 required time and effort and may require renewed approval of the Display Manger 200 by regulatory authorities for numerous jurisdictions.

Figure 34:
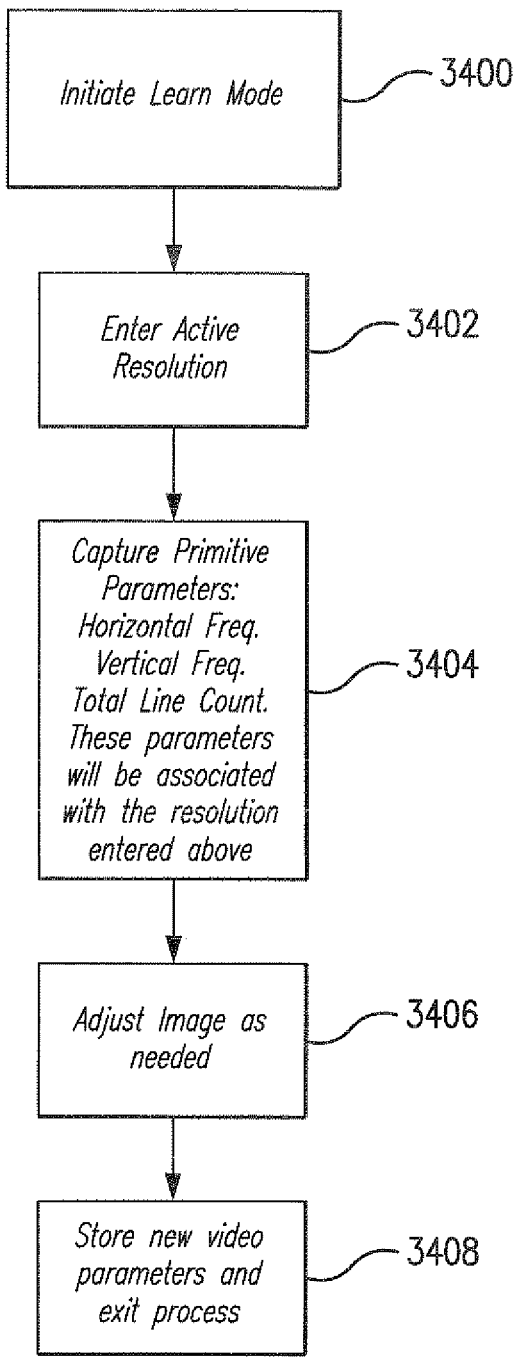
FIG. 34 is a logic flow diagram showing an aspect of the Display Manager tuning functionality according to an embodiment of the present invention.
Figure 35:
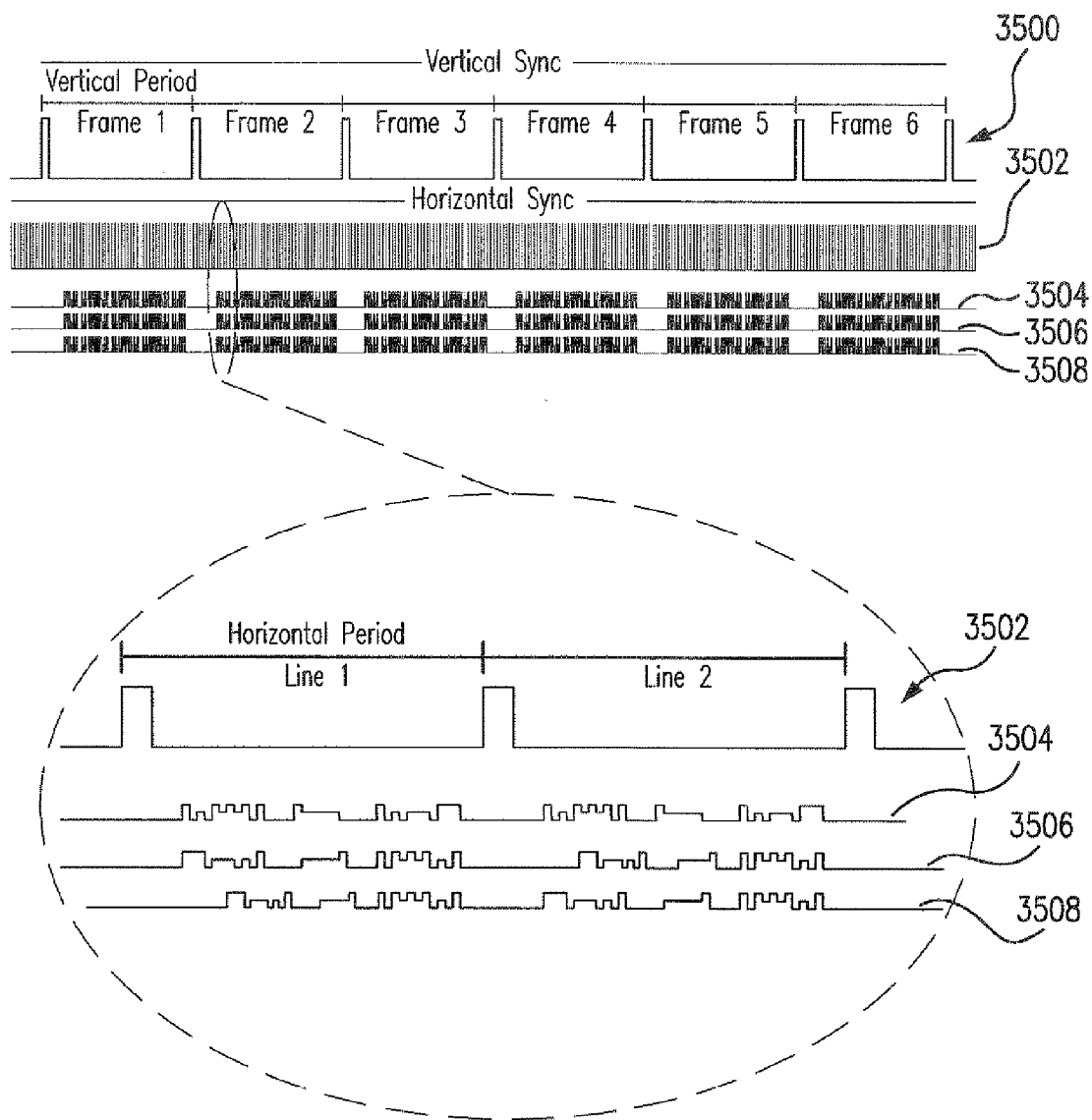
FIG. 35 is a diagram of the primitives for a VGA signal.

To overcome these drawbacks, according to an embodiment of the present invention the Display Manger 200 is provided with a non-volatile memory configured to store data corresponding to video signature data and a corresponding scalar video adjustment data, e.g. timing parameters. With reference to FIG. 34, the Display Manger 200 is configured to capture signal "primitives" which, for a VGA video signal, include: Horizontal Frequency (or period), Vertical Frequency (or period) and the Total Number of horizontal lines, including blanking periods, for the signals. The blanking periods define the margins for the timing of the video signals which, for proper display, should be configured to match video presentation with the margins of the intended or target display. FIG. 35 illustrates these primitives At 3500 is a graph showing the Vertical Frequency which is used to synchronize the signal as well as the Horizontal Frequency shown as horizontal synch graph 3502. Additionally there are red, green and blue analogue signals (0-0.7V) 3504, 3506, 3508 used to control color. The extracted primitives or a portion or derivative thereof representing a video signature are compared by the Display Manger 200 to a data structure storing a list, table or matrix of recognized video signatures and corresponding tuning adjustments (timing) required by the scalar to properly scale the video image to the display. The list, table or matrix may include data representing the resolution/size of the target video display. If there is a corresponding signature in the table or listing, the scalar adopts the corresponding scaling to properly size the video data to the target video display such as the Main Game Display 120. When the Display Manager 200 encounters video signals from the Master Gaming Controller 110 which do not correspond to a "known" video format signature, an error message is produced.

To resolve the error condition, and according to the present invention, a learning mode 3400 (FIG. 34) is initiated. Using a device such as a tuner 3600 (FIG. 36) coupled to the Display Manager 200 such as through a USB or other conventional coupling (or wireless communication), a technician initiates the learning mode whereupon the Display Manger 200 is commanded to asynchronously poll the firmware to extract the video primitives and derived signature for unrecognized video signal. The technician at 3402 inputs the active resolution of the target video display such as the Main Game Display 120. The extracted primitives and/or signature for the video signal are at 3404 associated with the active resolution. Using a user interface 3602 on the tuner 3600 to make fine adjustments at 3406 to certain parameters such as the vertical and horizontal blanking periods in addition to input capture clock phase corrections. Other adjustments may include centering the image and insuring the image is of a proper size using commands tailored to the Display Manger 200 firmware. The Display Manger 200 at 3408 retains the new video timing and adjustment data in the table, list or matrix of the non-volatile memory associated with the video signature for future reference. Thus the next instance video signals are received which have the previously unknown video signature are encountered, the table can be referenced and the proper adjustments made to the video signals.

Figure 36:
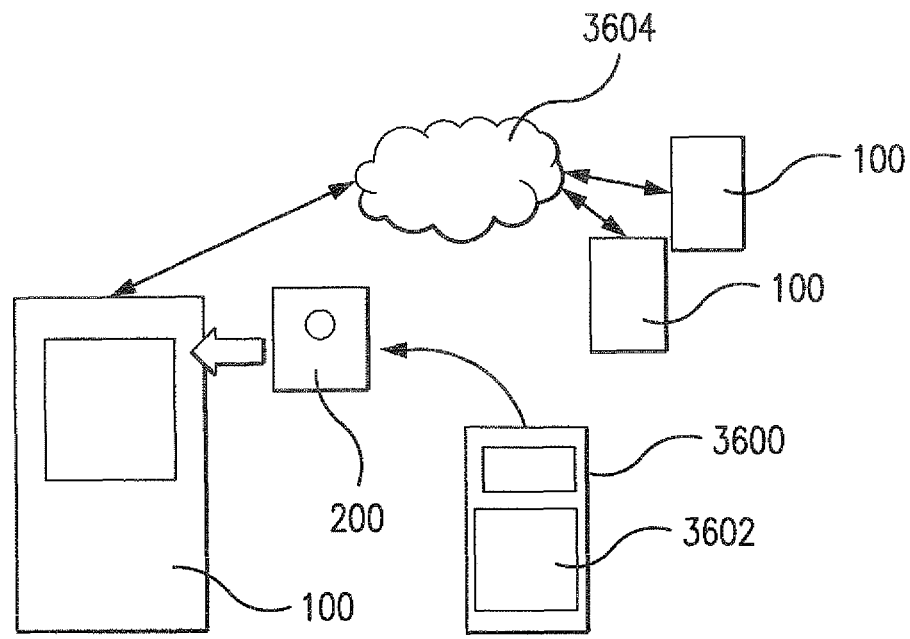
FIG. 36 is a diagram showing the connection of a tuner according to an embodiment of the present invention to the Display Manager and the system connection to the network.

Since the previously unknown video signals may be used for similarly configured gaming machines 100 it would be advantageous to be able to populate the adjustment data to those similar gaming machines 100. In FIG. 36 the gaming machine 100 is shown with the Display Manger 200 shown, for purposes of illustration, outside of the gaming machine 100. According to this embodiment, once the adjustment solution has been made and stored as described immediately above, the adjustment may be populated to other gaming machines 100 through a communication network 3604. For example, the Player Tracking Unit 101 may poll the Display Manger 200 to obtain any new adjustment data and broadcast the solution data throughout the network or to like configured gaming machines 100 for updating their tables stored in their non-volatile memories. As a further embodiment the tuner 3600 may store a copy of the data to accelerate the adjustment process.

Figure 37:
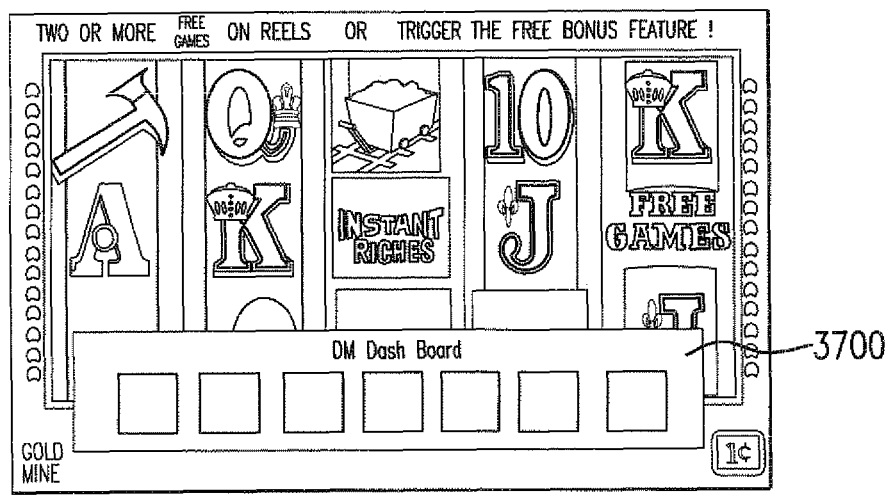
FIG. 37 shows an embodiment of the invention where the Display Manager displays a diagnostic dashboard.

Turning to FIG. 37 there is shown a further feature of the present invention. According to this embodiment, the tuner 3600 can provide navigation tools that allow the user to check on the status of systems connected directly or indirectly to the Display Manger 200. According to this embodiment the tuner 3600 when placed in communication with the Display Manger 200 can be configured to control the Display Manger 200 to display a diagnostic dashboard 3700 in, for example, a semi-transparent mode or in a PIP mode. As shown this dashboard may display indicators regarding the status of: the Player Tracking Device 101, the GMU 141, the system communication link, the system server(s), the player card reader and touch screen. These indicators may show a color to indicate status such as green for on-line and red for off-line.

2. Audio Scaling

Figure 38:
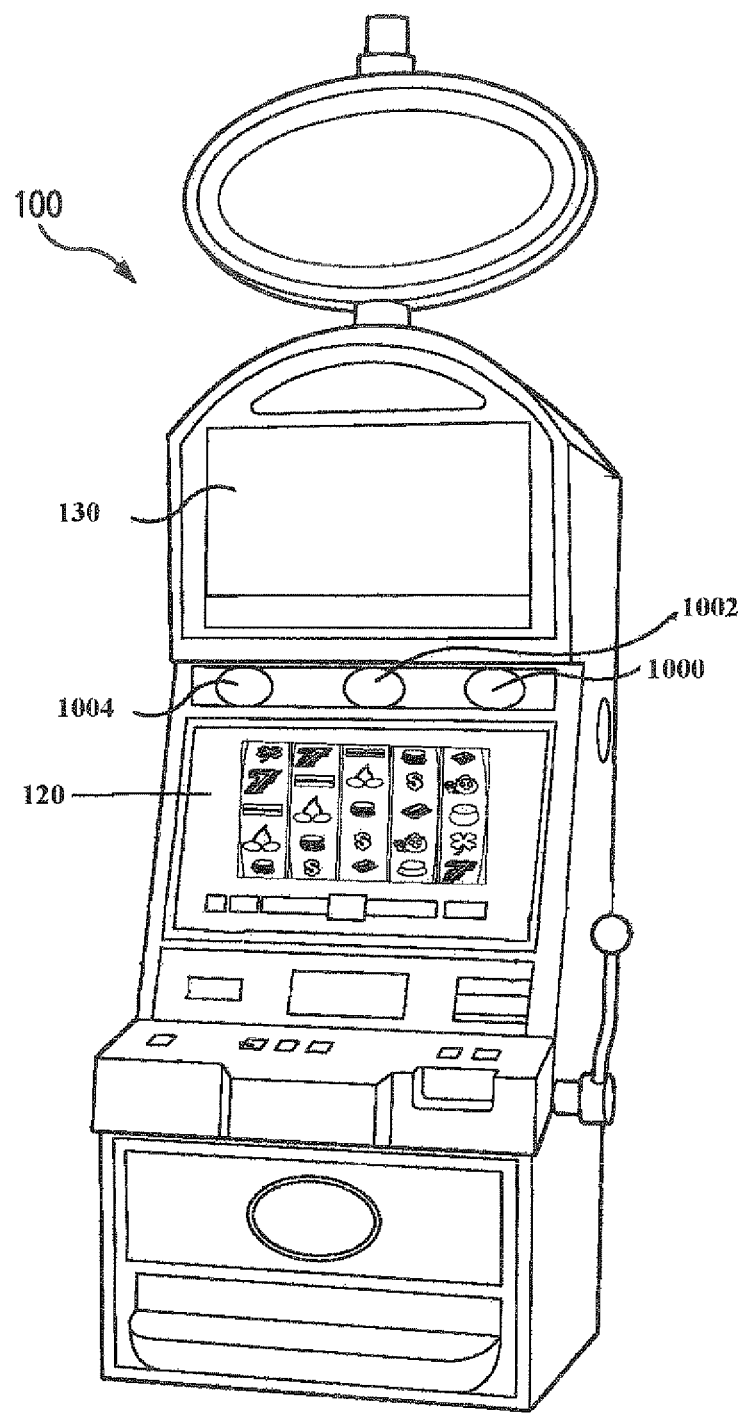
FIG. 38 shows a gaming machine according to an embodiment of the invention.

According to the present invention FIG. 38 illustrates a legacy gaming machine 100. While the present invention in one embodiment is directed to configuring existing devices such as gaming machines to operate as hereinafter described it should be understood that the devices could be newly assembled devices such as gaming machines 100 of a legacy design. Also according to the present invention the gaming machine 100 has been outfitted with a Display Manager 200 of the type described above for providing at least first video content from a first source and second video content from a second source. Alternatively, and according to the present invention, the functions provided by the Display Manager 200 could be provided by embedded hardware/software in, for example, the master gaming controller 110.

Where the device is a gaming machine 100 typically the first video content will be the gaming video content provided by one or more master gaming controllers 110 and consists of gaming content, e.g. base game graphics, bonus or second game graphics or other base game play features as well as first audio content associated with the game. As used herein "video content" includes recorded video content such as recorded video segments as well as animation, text or graphics. Video content should not be interpreted, unless otherwise specified herein, to be exclusively recorded video content. For example for a gaming machine game the video content may be graphics and symbols for a base game showing spinning reels to produce one or more base game outcomes as well as a bonus or secondary game including animation and recorded video content.

The game video content in the legacy gaming machine 100 drives at least the main game display 120 and perhaps also the secondary display 130 to display the game video content. First audio content provided with the game is delivered through a plurality of speakers shown by way of example as first, second and third speakers 1000, 1002 and 1004 respectively. As suggested in FIG. 38 first speaker 1000 is located above the main game display 120 on the right-hand side of the gaming machine 100 from the player's perspective, second speaker 1002 is located above the middle of the main game display 120 and third speaker 1004 is located above the main game display 120 toward the left-hand side of the gaming machine 100. Other speaker arrangements could be used. It should be noted that the speaker arrangements should be spaced to the right and left and/or above and below from the player's perspective. In the legacy machine 100 the first audio content associated with the first video content is provided to the first, second and third speakers 1000, 1002 and 1004 through, for example, a first audio channel from the one or more master gaming controllers 110.

As described above various sources of video content may be displayed at the main game display 120 (and/or secondary display) as configured by the Display Manager 200. For purposes of description of the present invention it shall be assumed that the first video content in the form of gaming content from the one or more master gaming controllers 110 is displayed at the main game display 120 only. It should be understood that the devices and methods of the present invention would also apply where first content is distributed across both the main game display 120 and the secondary display 130 or other game displays. Second video content is also provided from a second video source such as the network and/or Player Tracking Unit 101 to be displayed at the main game display 120 as described herein. The second video content can thus be associated with player tracking information of the type provided by a player tracking network host. Second video content could also well be advertising, commercial programming, messaging including emergency messages, system provided games such as a community game or the like. As with the first video content the second video content may have associated second audio content such as game sounds, music, sound effects, spoken word or the like.

In various embodiments the Display Manager 200 is configured to mix the first and second video content and position the content in areas on the video display such as the main game display 120. The positioning may be side-by-side, one over the other, superimposed where one content is semi-transparent or any other positional arrangement. The positioning of the content may also be selected by the player such as by closing one video content display to exclusively display the other video content or to select the positions for the content.

Figure 39:
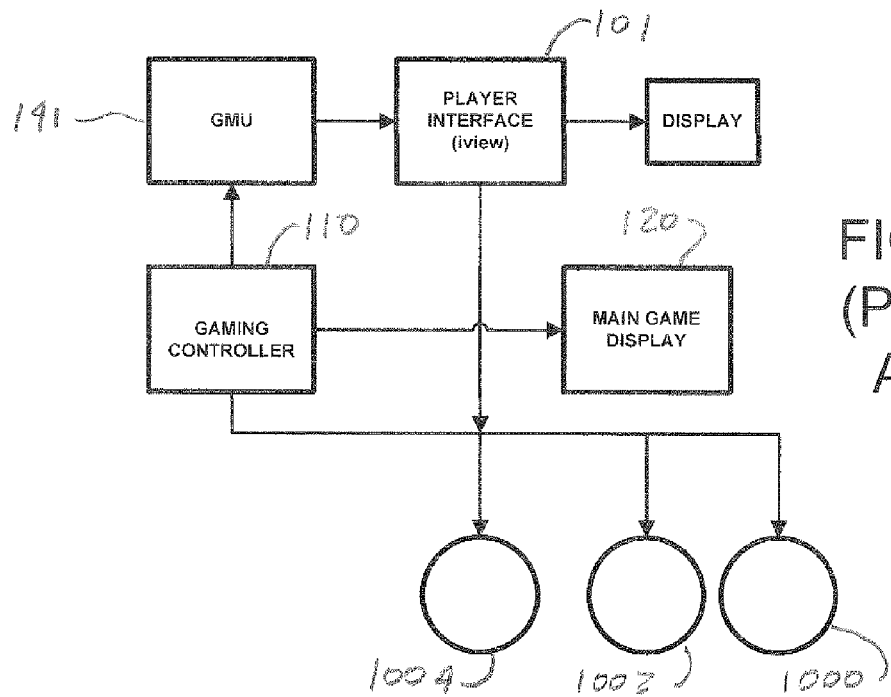
FIG. 39 illustrates components of a gaming machine according to the prior art.

Turning to FIG. 39 the arrangement of a gaming machine 100 according to the prior art, e.g. a legacy gaming machine 100, is displayed. The gaming machine 100 includes one or more game master game controllers 110 (FIG. 1) which are configured to provide a base game and any secondary or bonus games to the gaming machine 100 main game display 120 and/or secondary display 130. This base game includes first video and audio content. As shown the master game controller 110 also controls/drives the first, second and third speakers 1000, 1002 and 1004 to produce the desired first audio content to go along with the first video content. The gaming machine 100 also includes the GMU 141 (FIG. 1) which interfaces between the master gaming controller 110 and the system-player interface shown as Player Tracking Unit 101 (iView). In turn, the Player Tracking Unit 101 includes a display as also suggested in FIG. 8.

Figure 40:
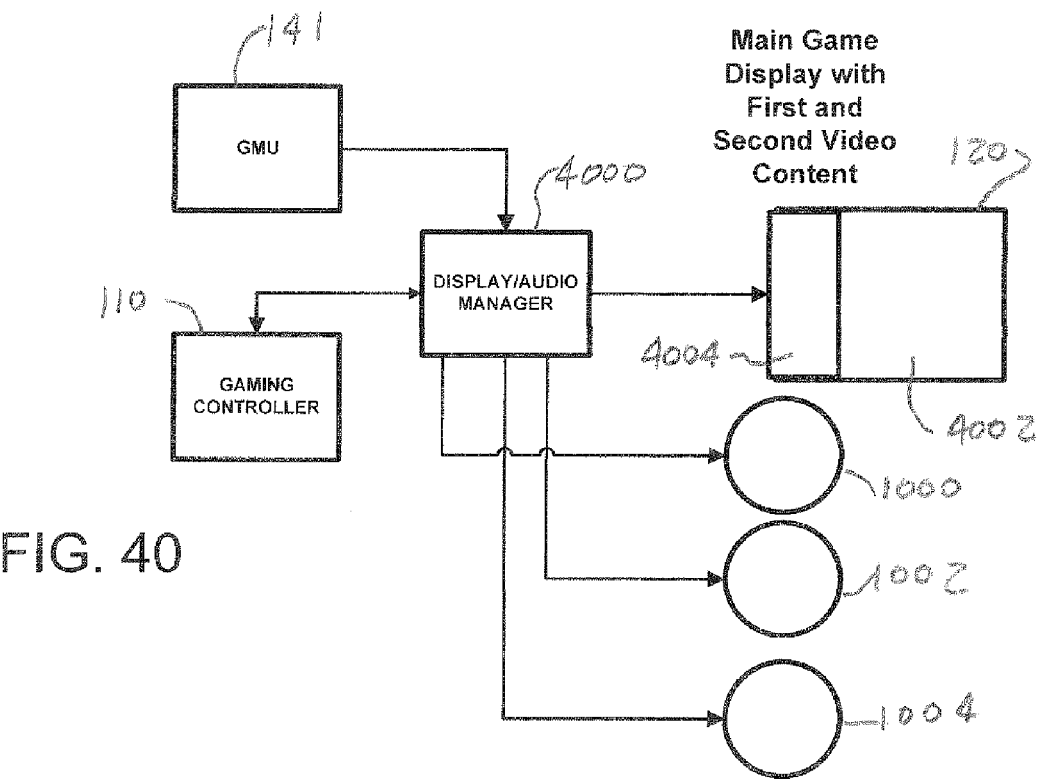
FIG. 40 illustrates components of the gaming machines according to the present invention.

FIG. 40 illustrates an arrangement according to the present invention. The base game/bonus game/secondary game related first audio output from the master game controller 110 is provided to the audio manager device 4000 as by a suitable connection such as a USB or audio jack connection. The audio device manager 4000 may be on a separate processing board or incorporated into the Display Manager 200 described above. Also provided to the audio manager device 4000 is the system interface-related second audio content shown as coming from the GMU 141 and from the Slot/CMP/SBG Media server/Browser manager 142 (FIG. 1). The second audio content coming from these system-related sources may be related to player tracking, advertising, a system based game or other feature. The connection for the second audio content may again be a USB or audio jack connection. In the arrangement according to the prior art (FIG. 39) this system related video content was provided to the iView (Player Tracking Unit 101) display. The Display Manager 200 instead takes this system related view content and controlled the main game display 120 to display both the system video content and game video content at the main game display 200.

The audio manager device 4000 is connected to and drives the speakers such as first, second and third speakers 1000, 1002 and 1004 to produce the audio in the manner as hereinafter described. The audio manager device 4000 may be connected to each of the first, second and third speakers 1000, 1002 and 1004 through separate audio channels so that each speaker may be separately controlled.

The audio manager device 4000 is also in communication with the Display Manger 200 for determination of the condition that the Display Manger 200 is controlling the main game display 120 and/or secondary display 130.

The operation of the audio manager device 4000 will now be described with reference to FIGS. 40, 41 and 4A. In a first condition where the Display Manager controls the main game display 120 to display only first video content such as base game content, the audio manager 4000 detects this condition and is configured to pass the first audio content to the speakers 1000, 1002, 1004 in the form and volume as provided from the one or more master gaming controller 110. In a second condition according to an embodiment of the present invention the Display Manager 200 controls the main game display 120 to display at a first location the first video content 4002 which is game content (Game Video 451) to the right side of the main game display 120. At a second location there is provided an area for the display of second content 4004 which may be provided as Player Tracking Unit Video 420 to the left side of the main game display 120. The Player Tracking Unit Video 420 may be content related to a player's account, a system related game, advertising or the like. According to this embodiment the audio manager 4000 is configured to control, for example when the player is playing the base game, the right hand speaker 1000 and middle speaker 1002 (from the player perspective) to output the first audio associated with the first video content, i.e. game video content. The left hand speaker 1004 may be "squelched" (i.e. silenced) or may produce audio at a reduced volume the second audio content. Similarly, when the audio manager 4000 for example detects that the player is not playing the game but is interacting with the system interface displayed at the second location, controls the left hand speaker 1004 (from the player's perspective) to output second audio content associated with the second video content at volume scaled to be greater than the volume associated with the first video content of the game produced at speakers 1000, 1002. By controlling and scaling the volume at the speakers 100, 1002, 1004 in such a manner directionality of the first and second audio can be provided to correspond to the player's actions draw the player's attention to the desired video content location. When the player is playing the game while the first and second video content are sharing the main game display 120, the first audio content played from the speakers 1000, 1002 is scaled to have audio primacy by playing at volumes higher than the second audio content playing at the speaker 1004 or to the exclusion of any audio from the speaker 1004 associated with the second video content. Conversely where the second video content is to have a primary presentation to the player as when the player is interfacing with the second video content, the audio content from the speaker 1004 may have audio primacy by being at a volume above or to the exclusion of the audio from the base game based audio content from the speakers 1000, 1002. Where there are multiple speakers the audio manager 4000 may be configured to control certain speakers, such as speaker 1002 located in the middle (in the player's perspective) to have equal primacy in its audio with the speakers 100 and 1004 having their audio controlled to provided the desired audio primacy and directionality.

As an illustrative example where the player is playing a game at the gaming machine 100 with no picture-in-picture functionality provided by the Display Manager 200, the audio manager 4000 directs the game audio to the speakers in a normal fashion. When the Display Manager 200 controls the display 120 to share the display of game video content and system delivered video content and the player desires to play the game appearing in the first location, the audio manager 4000 controls, for example, the speakers 1000, 1002 to produce the game sounds with the third speaker 1004 having a reduced volume of game audio or no sound. When the player decides to interface with the system interface display and the second video content, to provide directionality to the audio, the speaker 1004 is scaled to audio primacy either by decreasing or squelching the game audio at the first and second speakers 100, 1002. In this fashion the second audio is produced from the direction of the second video content. Where the first and second audio content has equal primacy the audio to the speakers may be scaled to substantially equal volumes.

Where, for example, an emergency message is broadcast from a host computer, the message may be interpreted as the second audio content and the third speaker 1004 scaled to a maximum volume and the game audio (first audio) scaled to silence or a minimum volume.

One of ordinary skill in the art will appreciate that not all gaming systems and methods will have all these components and may have other components in addition to, or in lieu of, those components mentioned here. Furthermore, while these components are viewed and described separately, various components may be integrated into a single unit in some embodiments.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A device for augmenting an existing user apparatus of the type having one or more processors configured to control at least one video display in a first condition to display first display content and in a second condition to control the at least one video display to display said first video content at a first location and second video content from a second source at a second location and a plurality of spaced speakers connected to said one or more processors and associated with the at least one video display, said one or more processors configured to output a first audio content to said speakers associated with said first video content to said speakers, said device comprising:
   at least one controller;
   a connector to re-direct said first audio content output by said one or more processors and provide the same as input to said at least one controller;
   a source for said second audio content, said second audio content associated with said second video content; and
   said at least one controller configured to, when said one or more processors are in a first condition, control said speakers to produce said first audio content and when said one or more processors are in said second condition control (i) at least one first speaker related with said first location to primarily provide said first audio content and (ii) at least one second speaker related with said second position to primarily provide said second audio content.

2. The device of claim 1 comprising said at least one controller configured to, when said one or more processors are in said second condition, provide control of the relative volumes of said first and second audio content.

3. The device of claim 1 comprising said at least one controller configured to, when said one or more processors are in said second condition, provide audio volume primacy to one of said first and second audio content.

4. The device of claim 3 comprising said at least one controller configured to, when said one or more processors are in said second condition, provide audio volume primacy to one of said first and second audio content based upon one or more of said first or second display content, a predetermined protocol or operator control.

5. The device of claim 1 comprising said connector is a connection port configured for connection of at least one of a USB or audio jack.

6. The device of claim 1 comprising said apparatus is a gaming device and said first display and audio content is associated with a game and the second display and audio content is associated with a player interface.

7. The device of claim 1 comprising, when said one or more processors are in said second condition and where said first video content is displayed at the right side of a video display and the second video content is at the left side of the video display, said at least one controller is configured to control said first speaker to produce said first audio content and said second speaker to produce said second audio content.

8. The device of claim 7 comprising said at least one controller is configured to, when said one or more processors are in said second condition, provide audio volume primacy to one of said first and second audio content.

9. The device of claim 1 where said apparatus includes a user input device for a user to define at least the location parameters of said first and second locations, said at least one controller configured to select said at least one of said first and second speakers in response to said user definition.

10. The device of claim 1 comprising said controller is configured to control primacy of audio volume between said first and second audio content to one or more of (i) substantially equal primacy, (ii) first audio content or second audio content primacy and (iii) first or second audio content primacy to the exclusion of the other audio content.

11. A device for augmenting a gaming machine for use by a player position in front of the gaming machine, the gaming machine of the type having one or more processors configured to control at least one video display in a first condition to display game video content and in a second condition to control the at least one video display to display said game video content at a first location and second video content from a second source at a second display location and a plurality of spaced speakers connected to said one or more processors and associated with the at least one video display, said one or more processors configured to output a game audio content to said speakers associated with said game video content to said speakers, said device comprising:
  at least one controller;
  a connector to re-direct said game audio content output by said one or more processors and provide the same as input to said at least one controller;
  a source for a second audio content, said second audio content to be associated with said second video content; and
  said at least one controller configured to, when said one or more processors are in a first condition, control said speakers to produce said game audio content and when said one or more processors are in said second condition control (i) at least one first speaker related with said first location to primarily provide said game audio content and (ii) at least one second speaker related with said second position to primarily provide said second audio content.

12. The device of claim 11 comprising said connector includes a network connection to receive said second video content and second audio content from a source remote to the gaming machine.

13. The device of claim 12 comprising said connector includes a network connection to receive said second video content and second audio content from one or more remote servers.

14. The device of claim 12 comprising said second video content and second audio content relates to a casino player account at a remote server.

15. The device of claim 11 comprising said controller is configured to control primacy of audio volume between said game and second audio content to one or more of (i) substantially equal primacy, (ii) game audio content or second audio content primacy and (iii) one of said game or second audio content primacy to the exclusion of the other audio content.

16. A method for providing audio directionality to an existing apparatus of the type having one or more processors controlling at least one video display in a first condition to display first video content and in a second condition controlling the at least one video display to display said first video content at a first location and second video content from a second source at a second location and a plurality of spaced speakers connected to said one or more processors, said one or more processors controlling said speakers to produce said first audio content associated with said first video content, said method comprising:
  configuring a device for incorporation into said apparatus, said device including at least one controller;
  enabling said at least one controller to receive said first audio signals and receive second audio signals from a source other than said one or more processors said second audio signals associated with said second display content; and
  configuring said at least one controller to, in said second condition, control at least one first speaker positioned to be related with said first location to provide said first audio content and at least one second speaker positioned to be related with said second location to provide primarily said second audio content.

17. The method of claim 16 comprising configuring said at least one controller for control of the relative volumes associated with said first and second audio content.

18. The method of claim 16 comprising configuring said controller to control primacy of audio volume between said first and second audio content to one or more of (i) substantially equal primacy, (ii) first audio content or second audio content primacy and (iii) one of said first or second audio content primacy to the exclusion of the other audio content.

19. A method for providing audio directionality to an existing gaming machine of the type having one or more processors controlling at least one video display in a first condition to display game video content to a player and in a second condition controlling the at least one video display to display said game video content at a first location and second video content from a second source at a second location to the player and a plurality of spaced speakers connected to said one or more processors, said one or more processors controlling said speakers to produce said game audio content associated with said game video content, said method comprising:
  configuring a device for incorporation into said gaming machine, said device including at least one controller;
  enabling said at least one controller to receive said game audio content and receive second audio signals from a source other than said one or more processors said second audio signals associated with said second video content; and
  configuring said at least one controller to, in said second condition, control at least one first speaker positioned to be related with said first location to primarily provide said game audio content and at least one second speaker positioned to be related with said second location to provide primarily said second audio content.

20. The method of claim 19 comprising said first and second speakers are located to the player's right side and left side.

21. The method of claim 19 comprising said second content is associated with a player interface.

22. A method for providing audio directionality to an existing apparatus of the type having one or more processors controlling at least one video display in a first condition to display first video content and in a second condition controlling the at least one video display to display said first video content at a first location and second video content from a second source at a second location and a plurality of spaced speakers connected to said one or more processors, said one or more processors controlling said speakers to produce said first audio content associated with said first video content, said method comprising:
- configuring a device for incorporation into said apparatus, said device including at least one controller;
- enabling said at least one controller to receive said first audio signals and receive second audio signals from a source other than said one or more processors, said second audio signals associated with said second video content; and
- configuring said at least one controller to, in said second condition, scale the volume of audio output to control at least one first speaker positioned to be related with said first location to primarily provide said first audio content and at least one second speaker positioned to be related with said second location to provide primarily said second audio content.

* * * * *